US012507724B2

(12) United States Patent
Plattner et al.

(10) Patent No.: US 12,507,724 B2
(45) Date of Patent: Dec. 30, 2025

(54) METHOD OF PRODUCING TOBACCO MOUSSE

(71) Applicant: JT International S.A., Geneva (CH)

(72) Inventors: Michael Plattner, Trier (DE); Michael Orth, Trier (DE); Remigius Mastalerz, Konz (DE)

(73) Assignee: JT International SA (CH)

( * ) Notice: Subject to any disclaimer, the term of this patent is extended or adjusted under 35 U.S.C. 154(b) by 0 days.

(21) Appl. No.: 18/647,856

(22) Filed: Apr. 26, 2024

(65) Prior Publication Data

US 2024/0277023 A1 Aug. 22, 2024

Related U.S. Application Data

(62) Division of application No. 17/255,641, filed as application No. PCT/EP2019/067335 on Jun. 28, 2019, now abandoned.

(30) Foreign Application Priority Data

Jun. 28, 2018 (EP) .................................... 18180577

(51) Int. Cl.

| | |
|---|---|
| ***A24B 15/167*** | (2020.01) |
| ***A24B 15/40*** | (2006.01) |
| ***B01F 23/235*** | (2022.01) |
| ***B01F 23/80*** | (2022.01) |

(52) U.S. Cl.

CPC .......... *A24B 15/167* (2016.11); *A24B 15/403* (2013.01); *B01F 23/235* (2022.01); *B01F 23/802* (2022.01)

(58) Field of Classification Search

CPC ....... A24B 15/14; A24B 15/16; A24B 15/167; A24B 15/30; A24D 1/002

See application file for complete search history.

(56) References Cited

U.S. PATENT DOCUMENTS

| | | | | |
|---|---|---|---|---|
| 4,002,178 A * | 1/1977 | Fiore | A24B 15/14 131/358 |
| 4,284,089 A * | 8/1981 | Ray | A24F 42/60 131/270 |
| 7,500,485 B1 | 3/2009 | Shepard et al. | |
| 2011/0088708 A1* | 4/2011 | John | A24B 15/14 131/352 |
| 2016/0286851 A1 | 10/2016 | Hufnagel et al. | |
| 2019/0343168 A1 | 11/2019 | Plattner et al. | |

FOREIGN PATENT DOCUMENTS

| | | |
|---|---|---|
| EP | 1677632 B1 | 12/2009 |
| GB | 1013303 A | 12/1965 |
| JP | 2007-508835 A | 4/2007 |
| WO | 2014083333 A1 | 6/2014 |

OTHER PUBLICATIONS

International Search Report including Written Opinion for PCT/EP2019/067335 mailed Sep. 13, 2019; 17 pages.

* cited by examiner

*Primary Examiner* — Michael H. Wilson
*Assistant Examiner* — Stephanie Lynn Moore
(74) *Attorney, Agent, or Firm* — Lerner David LLP

(57) ABSTRACT

Methods of forming a foam including a tobacco ingredient containing agent and/or an inhalable agent, an aerosol forming agent, a foam stabilizing agent, and a foam forming agent are provided, along with a foam produced by the methods, and foams with a certain aeration, for example of at least 4 vol. % based on the total volume of the foam.

7 Claims, 2 Drawing Sheets

METHOD OF PRODUCING TOBACCO MOUSSE

CROSS-REFERENCE TO RELATED APPLICATIONS

This application is a divisional of U.S. application Ser. No. 17/255,641, filed on Dec. 23, 2020, which is a national phase entry under 35 U.S.C. § 371 of International Application No. PCT/EP2019/067335, filed Jun. 28, 2019, published in English, which claims priority to European Application No. 18180577.1 filed Jun. 28, 2018, the disclosures of which are incorporated herein by reference.

SUMMARY

The present invention relates to methods of forming a foam comprising a tobacco ingredient containing agent and/or an inhalable agent, an aerosol forming agent, a foam stabilizing agent, and a foam forming agent, a foam produced by the methods, and foams with a certain aeration.

BACKGROUND ART

Foamed tobacco products have been known in the prior art mainly in the field of reconstituted tobacco products. Manufacturing processes usually involve forming reconstituted tobacco sheets out of finely ground tobacco particles with a foam forming and a foam stabilizing agent, followed by shredding the reconstituted sheets, and blending with natural tobacco shreds. The reconstituted tobacco products are usually used for the manufacture of cigarettes.

For example, tobacco foams are used for producing reconstituted tobacco, as disclosed in e.g. U.S. Pat. No. 4,002,178 A, wherein the precursors glycerine and propylene glycol are used in an amount of less than 5%, and tobacco in about 70%. U.S. Pat. No. 7,500,485B1 describes a foamed tobacco composition wherein the amount of tobacco is about 40 wt.-%.

GB 1,013,303 A relates to a smoking article and a process for making it, wherein a tobacco paste or slurry is formed which may be formed into an article suitable for smoking.

U.S. Pat. No. 4,002,178 A discloses a cigar tobacco sheet of low density, smoking articles prepared therewith, and foamed intermediates therefor.

In WO 2014/083333 A1 a method of controlling the filling value of a smokeable material is provided.

However, these foams are intended for use by combustion as a replacement for tobacco using reconstituted tobacco.

Further, foams comprising tobacco that are used for combustion, i.e. burning, are disclosed in U.S. Pat. No. 7,500,485 B1, US 2016/286851 A1 and US 2011/088708 A1.

U.S. Pat. No. 7,500,485 B1 relates to a foamed tobacco composition which includes tobacco particles, water and a foam stabilizer which is a hydrophobically modified hydroxyalkylated carbohydrate, as well as the use thereof in a low density tobacco sheet material, which then can be used to produce filler material in cigars, cigarettes or pipes.

In US 2016/286851 A1 a smoking composition comprising an aerosol-forming substrate and a flavor precursor compound is disclosed.

US 2011/088708 A1 describes smokable filler materials and a process for making same, wherein the smokable filler material comprises a foaming agent, an agent capable of forming chemical cross-linkages, and a cross-linking agent.

The spread and popularity of electronic cigarettes (e-cigarettes) came with the need and possibility for novel tobacco products to be vaporized and inhaled by smokers. E-cigarettes or similar devices like electronic pipes usually generate an aerosol by heating a liquid comprising an aerosol forming agent, water, and optionally additional flavoring and nicotine. Overall, this can lead to an uneven smoking profile, wherein the experienced flavor of puffs can differ significantly, e.g. by an inefficient extraction of key compounds in the liquid.

The problem of the present invention is to provide improved methods of forming a foam comprising a tobacco ingredient containing agent and/or an inhalable agent, an aerosol forming agent, a foam stabilizing agent, and a foam forming agent.

BRIEF DESCRIPTION OF THE INVENTION

The inventors have found that improved methods of forming a foam comprising a tobacco ingredient containing agent and/or an inhalable agent, an aerosol forming agent, a foam stabilizing agent, and a foam forming agent can be obtained by adjusting various factors in the producing step, wherein foams with improved taste, stability and processability can be obtained.

In a first aspect the present invention relates to a method of forming a foam, comprising

- mixing an aerosol forming agent, a foam forming agent and optionally a solvent and/or
- at least one non-tobacco flavoring agent, preferably under heating;
- optionally aerating the mixture;
- adding to the mixture a tobacco ingredient containing agent and/or an inhalable agent;
- optionally aerating the mixture;
- adding a foam stabilizing agent; and
- cooling of the mixture;
- wherein the mixture is aerated after the adding of the foam stabilizing agent and/or after cooling of the mixture,
- preferably wherein the foam stabilizing agent is added after the foam forming agent, aerosol forming agent, the optional solvent, and the tobacco ingredient containing agent and/or an inhalable agent.

A second aspect of the present invention relates to a method of forming a foam, comprising

- mixing an aerosol forming agent and optionally a solvent and/or at least one non-tobacco flavoring agent, preferably under heating;
- optionally aerating the mixture;
- adding to the mixture a tobacco ingredient containing agent and/or an inhalable agent;
- optionally aerating the mixture;
- adding a foam forming agent;
- optionally aerating the mixture;
- adding a foam stabilizing agent; and
- cooling of the mixture;
- wherein the mixture is aerated after the adding of the foam stabilizing agent and/or after cooling of the mixture,
- preferably wherein the foam stabilizing agent is added after the foam forming agent, aerosol forming agent, the optional solvent, and the tobacco ingredient containing agent and/or an inhalable agent.

A third aspect of the present invention is directed to a foam produced by the method of the first or second aspect.

Further disclosed is in a fourth aspect a foam comprising:

a tobacco ingredient containing agent and/or an inhalable agent, an aerosol forming agent, a foam stabilizing agent, and a foam forming agent, wherein the weight of the tobacco ingredient containing agent and/or the inhalable agent is 0.1-33 wt.-% of the weight of the foam, and the weight of the aerosol forming agent is 10-80 wt. %, preferably 40-70 wt.-%, of the weight of the foam, having an aeration of at least 4 vol. %, preferably having an aeration of at least 5 vol. %, e.g. 5-7 vol. %, based on the total volume of the foam.

A fifth aspect of the present invention relates to a foam essentially consisting of a tobacco ingredient containing agent and/or an inhalable agent, an aerosol forming agent, a foam stabilizing agent, and a foam forming agent, having an aeration of at least 4 vol. %, preferably having an aeration of at least 5 vol. %, e.g. 5-7 vol. %, based on the total volume of the foam.

In a sixth aspect a foam is disclosed, comprising:

a tobacco ingredient containing agent and/or an inhalable agent, an aerosol forming agent, a foam stabilizing agent, and a foam forming agent, wherein the foam forming agent is a non-protein containing polysaccharide and the weight of the foam forming agent is less than 20 wt.-% of the foam, having an aeration of at least 4 vol. %, preferably having an aeration of at least 5 vol. %, e.g. 5-7 vol. %, based on the total volume of the foam.

A seventh aspect of the present invention relates to a foam comprising a foam stabilizing agent, a foam forming agent, and an aerosol forming agent, wherein the weight of the aerosol forming agent in the foam is 10-80 wt. %, preferably 40-70 wt.-%, of the weight of the foam, having an aeration of at least 4 vol. %, preferably having an aeration of at least 5 vol. %, e.g. 5-7 vol. %, based on the total volume of the foam.

Further aspects and embodiments of the invention are disclosed in the dependent claims and can be taken from the following description and examples, without being limited thereto.

FIGURES

The enclosed drawing should illustrate embodiments of the present invention and convey a further understanding thereof. In connection with the description it serves as explanation of concepts and principles of the invention. Other embodiments and many of the stated advantages can be derived in relation to the drawing.

DETAILED DESCRIPTION OF THE INVENTION

Definitions

Figure 1:
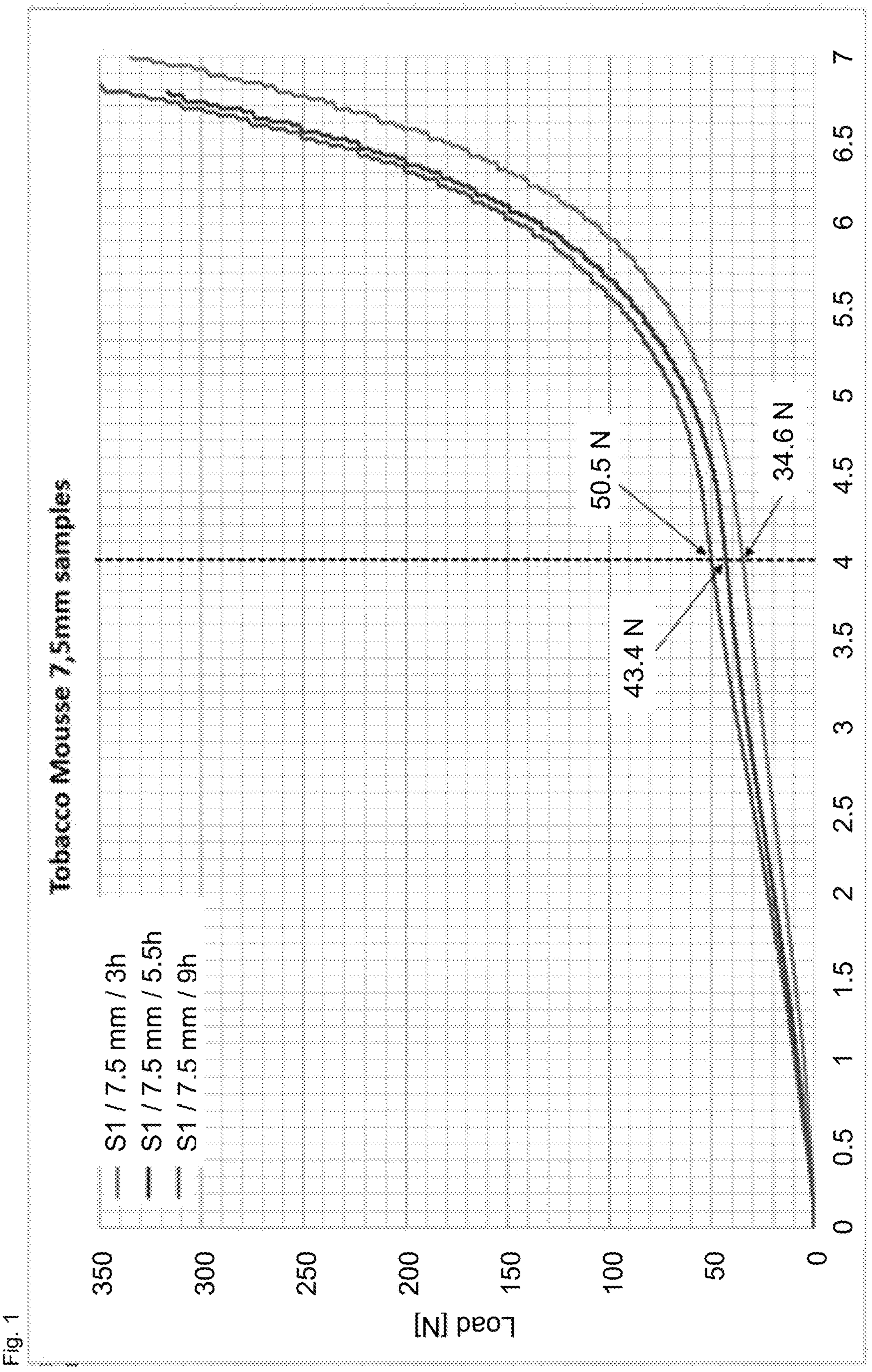
FIG. 1 shows data of an example of a tray filling using a foam produced by a method of the present invention.

Unless defined otherwise, technical and scientific terms used herein have the same meaning as commonly understood by one of ordinary skill in the art to which this invention belongs.

All values given in the present disclosure are to be understood to be complemented by the word "about", unless it is clear to the contrary from the context.

An open pored foam as used herein is to be understood as a foam which can be considered as being formed of a plurality of interconnecting pores (formed out of a structural material derived from the foam forming agent cooperating with the interacting components such as the foam stabilizing agent, solid components such as tobacco particles and some solvent, etc.) which are able to contain fluid, in particular a mixture of humectant/liquid aerosol forming substrate and air, wherein at least a significant portion (e.g. greater than 50% by volume) of the pores in the foam are fluidly connected with each other, contrary to a closed-cell foam, wherein the majority of the pores form discrete pockets, each completely enclosed by pore-forming material so as to substantially prevent fluid from passing freely between pores. It is currently believed that the mousses formed as described herein are largely open-pored mousses because after heating the mousse to release vapour, substantially all of the humectant appears to be released based on measuring the weight of the mousse portion before and after heating, which could not be readily explained if the humectant was not able to travel through neighbouring pores to reach the surface of the mousse portion. However, alternative explanations cannot be totally excluded—for example closed pores could perhaps be opened by rupturing a closed cell wall as a result of the pressure of vaporized gas, etc.

A tobacco ingredient containing agent can be any compound, mixture, particle matter, and/or solution that contains and/or carries a constituent of tobacco, either artificially included or naturally contained in tobacco, e.g. tobacco, tobacco particles, tobacco flavor and/or nicotine. In contrast, an example for an artificially added non-tobacco-specific flavor would be menthol.

An inhalable agent can be any compound, mixture, particle matter and/or solution that may be inhaled, for example as a gas and/or aerosol, and it e.g. includes and/or carries at least one of a stimulant, e.g. caffeine, guarana and combinations thereof, and/or a flavor, e.g. menthol, natural and/or artificial plant flavors, saccharides, animal flavors, and combinations thereof. The inhalable agents can be included to have the same approximate proportion with the aerosol forming agent as found in conventional e-liquids well known to persons skilled in the art.

An aerosol forming agent can be any compound, mixture and/or solution that is capable of forming an aerosol, e.g. when heated and/or in mixture with a tobacco ingredient containing agent and/or an inhalable agent. Well known examples include humectants such as glycerin and propylene glycol, other alcohols, such as ethanol, or water etc.

An aerosol generation apparatus within the present invention is not particularly limited, and is used to generate an aerosol. It can comprise, for example, an electronic cigarette (e-cigarette) or similar devices, like electronic pipes.

An electronic cigarette (e-cigarette) or similar devices like electronic pipes, as referred to in the present invention, are not particularly limited, and may be used to provide a user with an aerosol to inhale. It can, according to certain embodiments, comprise a mouthpiece, a heater, a receiving portion, e.g. a pod, and a casing.

A pod is not particularly limited and can be a storage device into which the present foam can be, e.g. removably, inserted. It can for example be in cylindrical, conical, stick and/or cuboid form, but is not limited to such shapes.

An induction heating system as referred to in the present invention and mentioned as an example of a heater is not particularly limited and may be any system which uses electromagnetic induction created by a coil positioned around an electrically conducting material, and more particularly a ferromagnetic material, to generate heat.

As used herein, wt.-% is to be understood as weight percent, based on the total weight of the foam, unless explicitly otherwise specified. In the present disclosure, all amounts are given in wt.-%, unless clearly stated otherwise or obvious from context. In the present disclosure, furthermore all amounts given in wt.-% in a particular foam add up to 100 wt.-%. The weight percent are thereby calculated by dividing the mass of each component by the total mass of the foam, unless indicated otherwise or clear from context.

As used herein, vol. % is to be understood as volume percent, based on the total volume of the foam, unless explicitly otherwise specified. In the present disclosure, all amounts given in vol. % in a particular foam add up to 100 vol. % The volume percent are thereby calculated by dividing the volume of each component by the total volume of the foam, unless indicated otherwise or clear from context.

Similarly, aeration values indicate the vol. % of the foam/mousse which is composed of air. The actual aeration values of samples have been estimated using the following procedure: a sample of "foam" is made without taking any action (e.g. whipping or aerating with an aeration machine) to aerate the "foam" and a known volume of this unfoamed "foam"/material is measured. Then a sample of the foam made after performing an aeration step (e.g. a step such as whipping or aerating with an aeration machine) and the same known volume of the aerated foam is again weighed and the percentage reduction in the weight is calculated. By assuming that the aeration of the unfoamed material is zero and by assuming that the air has a negligible weight, this directly gives an estimation of the aeration value by assuming that the reduction in measured weight results from replacement of the unfoamed material with (weightless) air. E.g. if the weight is observed to be 4% less for the same volume of foamed material compared to that volume of unfoamed material, then is assumed that 4% of the unfoamed material has been replaced with air, meaning that the vol. % of air is 4%.

Particle sizes, as disclosed in this invention, can be measured by any suitable method, e.g. sieving or laser diffraction, preferably sieving.

The present invention relates in a first aspect to a method of forming a foam, comprising

- mixing an aerosol forming agent, a foam forming agent and optionally a solvent and/or at least one non-tobacco flavoring agent, preferably under heating;
- optionally aerating the mixture;
- adding to the mixture a tobacco ingredient containing agent and/or an inhalable agent;
- optionally aerating the mixture;
- adding a foam stabilizing agent; and
- cooling of the mixture;
- wherein the mixture is aerated after the adding of the foam stabilizing agent and/or after cooling of the mixture,
- preferably wherein the foam stabilizing agent is added after the foam forming agent, aerosol forming agent, the optional solvent, and the tobacco ingredient containing agent and/or an inhalable agent. According to certain embodiments the steps can be carried out in this order.

According to certain embodiments, heating is carried out during or after adding the tobacco ingredient containing agent and/or an inhalable agent; and/or during or after adding the foam stabilizing agent; and before cooling.

According to certain embodiments, heating is carried out during or after adding the tobacco ingredient containing agent and/or an inhalable agent; and/or during or after adding the foam stabilizing agent and before cooling.

In a second aspect the present invention relates to a method of forming a foam, comprising mixing an aerosol forming agent and optionally a solvent and/or at least one non-tobacco flavoring agent, preferably under heating;

- optionally aerating the mixture;
- adding to the mixture a tobacco ingredient containing agent and/or an inhalable agent;
- optionally aerating the mixture;
- adding a foam forming agent;
- optionally aerating the mixture;
- adding a foam stabilizing agent; and cooling of the mixture;
- wherein the mixture is aerated after the adding of the foam stabilizing agent and/or after cooling of the mixture,
- preferably wherein the foam stabilizing agent is added after the foam forming agent, aerosol forming agent, the optional solvent, and the tobacco ingredient containing agent and/or an inhalable agent. According to certain embodiments the steps can be carried out in this order.

According to certain embodiments, heating is carried out during or after adding the tobacco ingredient containing agent and/or an inhalable agent; and/or during or after adding the foam stabilizing agent; and before cooling.

If no solvent and at least one non-tobacco flavoring agent is added in the first step, the method of the second aspect can also be read as:

A method of forming a foam, comprising providing an aerosol forming agent, preferably under heating;

- optionally aerating the aerosol forming agent; adding to the aerosol forming agent a tobacco ingredient containing agent and/or an inhalable agent;
- optionally aerating the mixture (formed of the aerosol forming agent and the tobacco
- ingredient containing agent and/or the inhalable agent); adding a foam forming agent;
- optionally aerating the mixture; adding a foam stabilizing agent; and cooling of the mixture;
- wherein the mixture is aerated after the adding of the foam stabilizing agent and/or after cooling of the mixture,
- preferably wherein the foam stabilizing agent is added after the foam forming agent, aerosol forming agent, the optional solvent, and the tobacco ingredient containing agent and/or an inhalable agent. According to certain embodiments the steps can be carried out in this order.

According to certain embodiments, the method of the second aspect comprises, in this order,

- mixing an aerosol forming agent and optionally a solvent and/or at least one non-tobacco flavoring agent, preferably under heating;
- adding to the mixture a foam forming agent;
- optionally aerating the mixture;
- adding a tobacco ingredient containing agent and/or an inhalable agent;
- optionally aerating the mixture;
- adding a foam stabilizing agent; and
- cooling of the mixture;
- wherein the mixture is aerated after the adding of the foam stabilizing agent and/or after cooling of the mixture, preferably wherein the foam stabilizing agent is added after the foam forming agent, aerosol forming agent, the optional solvent, and the tobacco ingredient containing agent and/or an inhalable agent.

According to certain embodiments, heating is carried out during or after adding to the mixture a foaming agent, and/or during or after adding the tobacco ingredient containing agent and/or an inhalable agent; and/or during or after adding the foam stabilizing agent; and before cooling.

If no solvent and at least one non-tobacco flavoring agent is added in the first step, this can also read as follows:

According to certain embodiments, the method of the second aspect comprises, in this order,

- providing an aerosol forming agent, preferably under heating;
- adding to the mixture a foam forming agent;
- optionally aerating the mixture;
- adding a tobacco ingredient containing agent and/or an inhalable agent;
- optionally aerating the mixture;
- adding a foam stabilizing agent; and
- cooling of the mixture;
- wherein the mixture is aerated after the adding of the foam stabilizing agent and/or after cooling of the mixture, preferably wherein the foam stabilizing agent is added after the foam forming agent, aerosol forming agent, the optional solvent, and the tobacco ingredient containing agent and/or an inhalable agent.

The following description of particular embodiments of the present methods relates to both the methods of the first and second aspect, unless clearly obvious otherwise, as well as other methods described herein.

The present methods are characterized in that the mixture is aerated after the adding of the foam stabilizing agent and/or after cooling of the mixture. This does not exclude that other aeration steps are carried out, and according to certain embodiments, one, two or preferably all of the optional aeration steps are carried out in the present methods. Also it is not excluded that aeration is carried out already concomitantly with a mixing and/or addition step.

The method of aeration is not particularly restricted and can involve e.g. an injection of air, a whipping in of air—e.g. a mixing with a sufficiently large paddle/shuffle and/or a sufficient paddle movement and/or at sufficient lower speed so that air can be introduced into the mixture, bubbling air through the mixture, etc. For example, aeration can be carried out using a sufficient mixing machine similar to a mixer for preparing a mousse, e.g. a Krups Prep & Cook HP 5031 mousse whipping shuffle, and or by injection air with an aerator, e.g. like Mondomix aerator. Aeration can be carried out at a suitable temperature, e.g. 30-80° C., e.g. to 35-75° C., preferably between and including 40-60° C. In the present methods it is not excluded that aeration is carried out concomitantly with a mixing and/or in a step of adding an ingredient, e.g. when using whipping.

In the present methods, the aerosol forming agent, the form foaming agent, the foam stabilizing agent, the tobacco ingredient containing agent, the inhalable agent, the at least one non-tobacco flavoring agent, and the solvent are not particularly restricted. Also a gas used for aeration is not particularly restricted, and can be e.g. air. Also further components can be admixed. According to certain embodiments, essentially no further components or no further components are admixed, though.

According to certain embodiments, the weight of the tobacco ingredient containing agent and/or the inhalable agent is 0.1-33 wt.-% of the weight of the foam in the present methods, and the weight of the aerosol forming agent is 10-80 wt.-%, preferably 40-70 wt.-%, particularly preferably 45-65 wt.-%, of the weight of the foam.

According to certain embodiments, the foam forming agent is a non-protein containing polysaccharide and the weight of the foam forming agent is less than 20 wt.-% of the foam. According to certain embodiments, the weight of the tobacco ingredient containing agent and/or the inhalable agent is 0.1-40 wt.-%, preferably 0.1-33 wt.-% of the weight of the foam, and/or the weight of the aerosol forming agent is 10-80 wt.-%, preferably 40-70 wt.-%, of the weight of the foam.

A wide range of aerosol forming agent amounts (by percentage weight) is possible, i.e. as set out above between 10-80 wt.-%. If more than 80 wt.-% are contained, foam cannot be reliably formed and the substance can remain entirely liquid. Such a point can e.g. be reached with formulations comprising between 70 to 80 wt.-%, with 80 wt.-% being achievable usually only with some difficulty. Formulations with 70 wt.-% can be reliably and stably formed with good vapour generation. On the other hand, by reducing the amount of aerosol forming agent the total amount of vapour which the mousse can generate in a smoking session is reduced. Accordingly other components can be increased in amount, though, e.g. the tobacco ingredient containing agent and/or an inhalable agent, leading to a different taste. If the amount of aerosol forming agent is too low, this may be detrimental to foam formation as well. Formulations forming a sufficient foam with contents of aerosol forming agent of 70 and 40 wt.-%, respectively, are given for samples 4 and 5 below in the present examples. With both a good and stable foam with a good release profile and taste profile were obtained. At the lower end of the aerosol forming agent amount by weight, below 20% it was difficult to form a foam—rather a dryish paste is formed instead. Moreover, below about 40% humectant, i.e. aerosol forming agent, level (down to 20%), the taste profile is weakened (as well as the total amount of vapour which can be generated from a given amount of mousse being reduced), possibly because the uptake of flavour from the tobacco or other flavour forming materials by the aerosol forming agent is reduced. Between 40% and 70% there is generally a trade off between the fullness of the taste (which is generally found to be optimum at around 40% humectant levels) and the amount of vapour which can be generated from a given volume of mousse. For some consumers the amount of vapour which can be generated from a given amount of mousse may be more important to them than the fullness of the taste (preferring say a weaker tasting mousse which nonetheless provides more puffs during a session before the mousse portion needs to be replaced).

According to certain embodiments, the balance to 100 wt.-% of the weight of the foam is essentially foam stabilizing agent and foam forming agent, so that essentially only these components are added in the present methods. Small amounts of water and/or acid and/or ester, e.g. diacetin, up to 15 wt.-%, preferably up to 5 wt.-%, further preferably up to 3.5 wt.-%, even further preferably up to 2.5 wt.-%, more preferably up to 1.5 wt.-%, and most preferably between 0.5-1.5 wt.-%, at least between 0.5-1.5 wt.-% water, can be added in the foam according to certain embodiments at a suitable time, e.g. together with the aerosol forming agent and/or the foam forming agent and/or the foam stabilizing agent and/or the tobacco ingredient containing agent and/or inhalable agent. A solvent is preferably added with the aerosol forming agent, if it is added. According to certain embodiments, no water and/or acid and/or ester, e.g. diacetin, or at least less than 1 wt.-%, is added to tin the present methods. In burning applications, e.g. smoking articles, normally water is contained in higher amounts as dry smoke does not taste so good. In contrast, the present foams are particularly not combusted and the aerosol forming agent can carry aromas and/or flavors, so that the amount of water can be kept low, although some small amounts of water may help to reduce any harshness in the vapour and give rise to a milder smoking experience. Similarly, the addition of a small amount of diacetin (preferably less than 1 wt.-%) may also reduce any harshness in the produced aerosol as experienced by users.

The tobacco ingredient containing agent, e.g. tobacco, may be used to provide authentic flavor, and is not particularly limited. According to certain embodiments, the tobacco ingredient containing agent of the present foam is at least one selected from the group consisting of tobacco, tobacco flavor such as various tobacco extracts, and nicotine or a derivative thereof. The tobacco, tobacco flavor and/or nicotine may be derived from any part of the tobacco plant (seed, stem, leave and so on).

Similarly, the inhalable agent is not particularly limited, and may be e.g. at least one of a stimulant, e.g. caffeine, guarana, and combinations thereof, and/or a flavor, e.g. menthol, natural and/or artificial plant flavors, e.g. flavourings known for use in conventional e-liquids for use with e-liquid vapourising e-cigarettes, e.g. in the amounts used therein, saccharides, animal flavors, and combinations thereof.

The tobacco ingredient containing agent and/or the inhalable agent are preferably comprised in the present foams in an amount of 0.1 to 40 wt.-%, further preferably 0.1-33 wt.-% of the weight of the foam and can be added accordingly. If the amount of tobacco is increased above 40 wt. %, particularly above 33 wt.-% of the weight of the foam, for example at the expense of the stabilizing agent, the foam, e.g. in a mousse, may become too brittle and unstable. Also if the amount of the tobacco ingredient containing agent and/or the inhalable agent is increased above this amount, the amount of the aerosol forming agent may be reduced, which can cause a lower amount of aerosol TPM (total particle matter, which is the amount of aerosol matter retained in a filter per user inhale). In certain embodiments the amount of tobacco ingredient agent and/or inhalable agent comprised in the foam is 1-30 wt.-% of the weight of the foam, preferably 3-29 wt. %, further preferably 5-28 wt.-%, more preferably 10-28 wt. %, even further preferably 11 to 27.5 wt.-%, e.g. 15 to 25 wt.-%, e.g. 11-23 wt.-%, e.g. 17-21 wt.-%.

According to certain embodiments, the tobacco ingredient containing agent comprises tobacco particles having a particle size of less than 200 μm, preferably less than 150 μm, further preferably less than 100 μm, even further preferably less than 50 μm, even preferably less than 30 μm, e.g. 2-150 μm, e.g. 5-100 μm, e.g. 5-50 μm, e.g. 5-30 μm, e.g. 5-15 μm, e.g. 20-50 μm, e.g. 60-90 μm. The particle size can be measured through sieving, and the particles may be obtained through any suitable shredding and/or milling process. According to certain embodiments, the tobacco particles have essentially a uniform size, e.g. a uniform size.

According to certain embodiments, the tobacco ingredient containing agent comprises tobacco particles having a particle size (D90) between 50 and 180 μm, preferably between 60 and 140 μm, further preferably between 65 and 125 μm, even further preferably between 70 and 110 μm, particularly preferably between 75 and 90 μm, e.g. having a particle size (D90) of about 80 μm. The particle size (D90) therein can be determined using a laser refraction method, particularly using a Malvern Mastersizer 3000. The parameter "particle size (D90)", also known as Dv(90), thereby defines the point in the size distribution, e.g. as measured using laser refractometry, e.g. using the Malvern Mastersizer 3000, up to and including which 90% of the total tobacco particles in the tobacco ingredient containing agent is contained. For example, if the D90 is 80 μm, this means that 90% of the sample has a size of 80 μm or smaller. The result of D(90) are given in volume % (Vol. %). When the particle size (D90) is too high, an aerosol formed by heating but not combusting an inventive foam shows harshness and off-taste.

However, it is also possible to add tobacco particles with different sizes in two or more fractions, e.g. a first fraction with particles having a size of less than 30 μm, e.g. less than 20 μm, and a second fraction with particles having a size of more than 30 μm, e.g. more than 50 μm, e.g. more than 100 μm, e.g. more than 200 μm. e.g. about 250 μm or more. Preferably, a, e.g. second, fraction of tobacco particles with a size of more than 30 μm is contained in a mixture of tobacco particles with different sizes in an amount of less than 90 wt.-%, preferably 80 wt.-%, or less, further preferably less than 50 wt.-%, even further preferably less than 40 wt.-%, even further preferably less than 30 wt.-%, even further preferably 20 wt.-% or less, based on the total weight of the tobacco particles. An addition of tobacco particles with a size of more than 30 μm can lead to a reduction in harshness of the aerosol liberated from the foam upon heating in the first puffs.

In the present methods and foams, the foam stabilizing agent is not particularly limited as long as it can stabilize the foam to some extent after formation. Particularly, the foam stabilizing agent can create and keep the porous microstructure of the foam according to certain embodiments. According to certain embodiments, the foam stabilizing agent of the present foam is selected from the group consisting of cellulose gum, hydroxyalkylated carbohydrates, derivatives thereof, e.g. salts thereof, preferably alkali metal salts thereof, e.g. sodium and/or potassium salts thereof, and mixtures thereof. Both of the cellulose gum and the hydroxyalkylated carbohydrates are not particularly restricted. According to certain, preferred, embodiments, the foam stabilizing agent is a cellulose gum, particularly a carboxymethylcellulose, or a derivative thereof. An exemplary, preferred, cellulose gum which may be used in the present invention is CEKOL® 2000 and/or Ceroga 4550C (C.E. Roeper GmbH), a purified sodium carboxymethylcellulose each. Another class of suitable foam stabilizing agents are hydroxyalkylated carbohydrates, and more preferably cellulose ethers and derivatives thereof. A cellulose ether or derivative thereof that can be used can have at least one substituent selected from the group consisting of methyl, ethyl, hydroxyethyl and hydroxypropyl groups. It can further be substituted with a linear or branched substituted or unsubstituted alkyl radicals having 1-20 carbon atoms or an aralkyl radical having 7 to 20 carbon atoms. Such radical is preferably attached by an ether linkage. Suitable substituents can e.g. a hydroxy group, a carboxy group with 1 to 4 carbon atoms, etc. According to certain embodiments the cellulose ether is selected from hydroxyethylcellulose, methylcellulose, methylhydroxyethylcellulose, ethylhydroxyethylcellulose, and mixtures thereof. Furthermore, mixtures of different cellulose gums, different hydroxyalkylated carbohydrates, and mixtures of one or more cellulose gum with one or more hydroxyalkylated carbohydrate, as well as derivatives of one or either thereof, can be used. Also included as derivatives are salts of these cellulose ethers, preferably alkali metal salts thereof, e.g. sodium and/or potassium salts thereof.

According to certain embodiments the foam stabilizing agent has a viscosity between 300 mPas and 3000 mPas, preferably between 400 mPas and 2500 mPas, further preferably between 500 mPas and 2000 mPas, even further preferably between 700 mPas and 1700 mPas, particularly preferably between 900 mPas and 150 mPas. The viscosity can be suitably measured using a Brookfield viscometer, e.g. at 25° C., e.g. at 60 rpm, e.g. using paddle no. 3, e.g. at 1% (LVT).

The amount of the foam stabilizing agent in the foam is not particularly limited as long as a suitably stable foam can be formed. For example, the foam stabilizing agent can be contained in an amount of 3-60 wt.-%, preferably 4-50 wt.-%, more preferably 4-45 wt.-9%, more preferably 4.2-40 wt.-%, further preferably 4.5-20 wt.-%, even further preferably 5-20 wt.-%, even further preferably 5.5-16 wt.-%, e.g. 8-40 wt.-%, e.g. 12-30 wt.-%, e.g. 16-20 wt.-%. If the amount of foam stabilizing agent is too low, formation of a stable foam is difficult. If the amount of foam stabilizing agent is too high, a negative off-taste can be observed in the aerosol formed when the foam is heated but not combusted.

Also the foam forming agent is not particularly restricted. According to certain embodiments, the foam forming agent of the present foam is selected from the group consisting of agar, gellan gum, lecithin, polyglycerol esters of fatty acids, glycerol esters of fatty acids, sorbitan esters of fatty acids, and/or mixtures thereof, without being limited thereto. A preferred foam forming agent is gellan gum. It has been shown that particularly proteoglycans, but also pectin and alginates, are less suitable as foam forming agents. The fatty acids therein are not particularly limited and can comprise e.g. 8-40 carbon atoms. Glycerol esters can be prepared by standard esterification methods. If glycerol esters of fatty acids are used, the foam forming agent can suitably be a compound such as glycerol monostearate and/or glycerol monooleate. Polyglycerol esters can be prepared by polymerizing glycerin under alkaline conditions suitably followed by reacting them with specific fatty acids. Suitable polyglycerol esters can be hexaglycerol monooleate, octaglycerol monostearate and/or octaglycerol monooleate. Sorbitan esters of fatty acids used in certain embodiments of the present invention can be sorbitan monostearate, sorbitan monooleate and/or sorbitan mono palmitate. Furthermore, any possible combinations of compounds belonging to the above mentioned classes can be used.

According to certain embodiments, the foam forming agent has a gel strength between 300 g/cm$^3$ and 3000 g/cm$^3$, preferably between 400 g/cm$^3$ and 2500 g/cm$^3$, further preferably between 500 g/cm$^3$ and 2000 g/cm$^3$, and/or has a viscosity between 300 mPas and 3000 mPas, preferably between 400 mPas and 2500 mPas, further preferably between 500 mPas and 2000 mPas. The viscosity can be measured as given above for the foam stabilizing agent, for example. The gel strength can be e.g. suitably measured using the Nikan method or the Kobe method, e.g. the Nikan method.

By choosing suitable amounts of foam forming agent and foam stabilizing agent together with the tobacco ingredient containing agent and/or the inhalable agent can create and stabilize the foam matrix, which can contribute to the hardness of the foam.

Like the foam stabilizing agent, the amount of the foam forming agent is not particularly limited as long as a foam is formed. For example, the foam forming agent can be contained in an amount of 0.5-12 wt.-%, preferably 1-11 wt.-%, more preferably 1.5-10 wt.-%, further preferably 1.8-9.5 wt.-%, further preferably 2-9 wt.-%, even further preferably 2-7 wt.-%, particularly preferably 2.25-6.75 wt.-%, further preferably 2.75-6.00 wt.-%, e.g. 3-5.5 wt.-%.

Furthermore, also the aerosol forming agent is not particularly limited, and the foam can comprise also more than one aerosol forming agent, e.g. two, three or four, e.g. in the form of a mixture.

According to certain embodiments, the aerosol forming agent of the present foam is selected from the group consisting of glycerol, glycol derivatives, sebacate esters, and/or mixtures thereof, without being limited thereto. A glycol derivative that can be used in certain embodiments is propylene glycol, and a suitable sebacate ester can be di-2-ethylhexyl sebacate. Furthermore, any possible combinations of compounds belonging to the above mentioned classes can be used. For example, a combination of glycerol and propylene glycol can be used as aerosol forming agent. Preferred examples of the present aerosol forming agent are glycerol, propylene glycol, and mixtures thereof, with glycerol and a mixture of propylene glycol and glycerol further preferred and a mixture of propylene glycol and glycerol even further preferred. According to certain embodiments, at least glycerol is comprised as an aerosol forming agent. According to certain embodiments, the glycerol and propylene glycol can be used with equal weight percent, but also with different weight percent. In certain embodiments, 10-95 wt.-% of glycerol and 5-90 wt.-% of propylene glycol, preferably 10-80 wt.-% of glycerol and 20-90 wt.-% of propylene glycol, further preferably 10-70 wt.-% of glycerol and 70-10 wt.-% of propylene glycol, e.g. 15-65 wt.-% of glycerol and 65-15 wt.-% of propylene glycol, preferably 20-40 wt.-% of glycerol and 10-40 wt.-% of propylene glycol, e.g. 20-40 wt.-% of glycerol and 20-40 wt.-% of propylene glycol can be used as aerosol forming agent, wherein the total mass of the aerosol forming agent is 10 to 80 wt.-%, preferably 40-70 wt.-% of the weight of the foam, so that the two components can be suitably set regarding their ratio. According to certain embodiments, glycerol is used as sole aerosol forming agent, though.

A suitable ratio of propylene glycol and glycerol is, according to certain embodiments, in a mixture comprising these two as aerosol forming agent or consisting of these two as aerosol forming agent, according to preferred embodiments between 8:1 and 1:8, preferably between 80:20 and 20:80, further preferably between 4:1 and 1:4, further preferably between 70:30 and 30:70, even further preferably between 1:2 and 2:1, e.g. between 60:40 and 40:60, e.g. between 55:45 and 45:55, based on a weight ratio. According to certain embodiments, glycerol is used in an excess amount compared to propylene glycol if they are both used as a mixture for an aerosol forming agent or particularly are used as aerosol forming agent. According to certain embodiments, glycerol is used in an amount of at least 55 wt.-%, preferably at least 60 wt.-%, based on the total amount of glycerol and propylene glycol in the aerosol forming agent. Accordingly, according to certain embodiments, propylene glycol is used in an amount of at most 45 wt.-%, preferably 40 wt.-% or less, based on the total amount of glycerol and propylene glycol in the aerosol forming agent. According to certain embodiments, the ratio between glycerol and propylene glycol is between 20:80 and 90:10, preferably between 40:60 and 85:15, further preferably between 55:45 and 80:20, even further preferably between 60:40 and 80:20, e.g. around 60:40, e.g. 60:40, based on the total amount of glycerol and propylene glycol in the aerosol forming agent. The ratio of propylene glycol and glycerol can influence the basic viscosity of the foam. A higher amount of glycerol leads to a higher viscosity and to a better texture of the foam, e.g. a mousse and enables a better release of the tobacco ingredient containing agent and/or the inhalable agent, leading to a better "body" for inhalation due to a better mingling. Further, a higher amount of glycerol can lead to a decreased level of initially created vapor upon heating, which can have an influence on the harshness of the vapor felt upon inhalation. At the same heating temperature, also glycerol can release less vapor volume than propylene glycol if the heating is above the boiling point of both. A higher amount of propylene glycol leads to a sweet top note during inhalation especially if 10 wt.-% or more, preferably 20 wt.-% or more, e.g. 20 to 40 wt.-%, or more than 20 wt.-%, more than 30 wt.-%, or more than 40 wt.-% of the total humectant/aerosol forming agent comprises propylene glycol rather than glycerin.

According to certain embodiments the aerosol forming agent is comprised in an amount of 10 to 80 wt.-%, preferably 20 to 75 wt.-%, further preferably 40-70 wt.-%, further preferably 45-70 wt.-%, more preferably 45-65 wt.-%, particularly preferably 50-63 wt.-%, more preferably 55 to 65 wt.-%, e.g. about 60 wt.-% of the weight of the foam, which is much higher than in the prior art regarding reconstituted tobacco foams, as an aerosol is to be formed. This can for example enable a more convenient foam manufacturing process than in the prior art. If the amount of aerosol forming agent is too high, though, no foam is formed, but a creamy liquid fluid. If the amount of aerosol forming agent is too low, no foam is formed, but a paste particularly without a foam structure, particularly bubbles and/or pores.

Propylene glycol as used in the present invention is to be understood as propane-1,2-diol. Glycerin or glycerol as used in the present invention is to be understood as 1,2,3-propanetriol.

The aerosol forming agent can further comprise water. According to certain embodiments, no water is contained, though, since water in aerosol form can burn the mouth of a user. Water can be contained in an amount of 0-15 wt.-% of the weight of the foam, e.g. 5-10 wt.-%. Small amounts of water and/or an acid and/or ester, e.g. diacetin, particularly of water and/or ester, e.g. diacetin, up to 5 wt.-%, preferably up to 3.5 wt.-%, further preferably up to 2.5 wt.-%, even further preferably up to 1.5 wt.-%, and most preferably between 0.5-1.5 wt.-%, at least between 0.5-1.5 wt.-% water, can be contained in the foam. According to certain embodiments, no water and/or acid, particularly no water and/or ester, e.g. diacetin, is contained in the present foam. If an ester, e.g. diacetin, is included, it is preferably included with 3 wt.-% or less, preferably 2 wt.-% or less, further preferably 1.5 wt.-% or less, e.g. 1 wt.-% or less.

According to certain embodiments, the present foams can further comprise at least one non-tobacco flavoring agent. In certain embodiments, the flavors can be selected from menthol, natural plant flavors, e.g., cinnamon, sage, herb, chamomile, kudzu (*Pueraria lobata*), Hydrangeae dulcis folium, clove, lavender, cardamom, caryophyllus, nutmeg, bergamot, geranium, honey essence, rose oil, lemon, orange, cassia bark, caraway, jasmine, ginger, coriander, vanilla extract, spearmint, peppermint, cassia, coffee, celery, cascarilla, sandalwood, cocoa, ylang ylang, fennel, anise, licorice, St John's bread, prune extract, and peach extract; saccharides, e.g., glucose, fructose, isomerized saccharide, and caramel; cocoa, e.g., powder and extract; esters, e.g., isoamyl acetate, linalyl acetate, isoamyl propionate, and linalyl butyrate; ketones, e.g., menthone, ionone, damascenone, and ethyl maltol; alcohols, e.g., geraniol, linalool, anethole, and eugenol; aldehydes, e.g., vanillin, benzaldehyde, and anisaldehyde; lactones, e.g., γ-undecalactone and γ-nonalactone; animal flavors, e.g., musk, ambergris, civet, and castoreum; and hydrocarbons, e.g., limonene and pinene, and combinations thereof, without being limited thereto. Such a flavor or others can be used alone or in combination. The non-tobacco flavoring agent can be e.g. added in an amount so that the total amount of tobacco ingredient containing agent and the non-tobacco flavoring agent, in case these two are comprised, add up to the amounts given for the tobacco ingredient containing agent given above.

In certain embodiments, the foams may comprise an electrically conducting material, and more particularly a ferromagnetic material, to generate heat by induction. The electrically conducting material is not particularly limited and may be any one of, or alloys of, iron, nickel, stainless steel, manganese, silicon, carbon and copper. The electrically conducting material might be in the form of a powder and/or larger particles. The amount thereof is not particularly restricted and can be suitably set.

The solvent is not particularly limited and can comprise e.g. purified water, an acid and/or ester, e.g. diacetin, and/or an alcohol such as ethanol, 1-propanol and/or 2-propanol, or mixtures thereof. For optionally injecting or swirling in a gas, e.g. during heating, the gas can be for example air, oxygen, nitrogen, or mixtures thereof. The adding a tobacco ingredient containing agent and/or the inhalable agent, adding a foam stabilizing agent, and cooling of the mixture are then not particularly restricted and can be carried out as described herein.

According to certain embodiments, the pH of the mixture in the present methods can be adjusted to a pH value between 5 and 9, e.g. between 5 and 8.5, preferably between 5.7 and 8.4, further preferably between 6 and 8.3 at any suitable time of the methods using a suitable pH adjusting agent. The pH adjusting agent is not particularly restricted and can be e.g. chosen from one or more of sodium carbonate, potassium carbonate, sodium hydrogen carbonate, potassium hydrogen carbonate, etc., and mixtures thereof. The amount thereof is not particularly restricted and can be e.g. between 0 and 2 wt.-%, preferably between 0.2 and 1.5 wt.-%, further preferably between and including 0.5 and 1 wt.-%, based on the total amount of the foam. The addition of a pH adjusting agent can increase the amount of the tobacco ingredient containing agent and/or the inhalable agent, e.g. nicotine, released, or perceived as having been released by a user, which can improve sensory satisfaction. However, if the pH is adjusted too high, this might negatively affect the taste.

According to certain embodiments, the step of mixing an aerosol forming agent, optionally a foam forming agent—in the first method—and optionally a solvent, preferably under heating, is carried out first. According to certain embodiments, the foam forming agent is therein added to the aerosol forming agent in the first method, particularly when the aerosol forming agent comprises more than one component, e.g. propylene glycol and glycerol. In the second method the foam forming agent is added preferably after the tobacco ingredient containing agent and/or inhalable agent, particularly when the tobacco ingredient containing agent and/or inhalable agent can be dissolved in the aerosol forming agent and the optional solvent and/or when they do not bind to the foam structure, i.e. are only adhered/adsorbed thereto and/or absorbed therein. When the foam forming agent is added the viscosity can be increased, and a bubbly microstructure, e.g. in the presence of air an airy microstructure, can be formed, which enables a constant release of aerosol from the foam upon heating as well as a release of a consistent vapor volume. In the second method then also the tobacco ingredient containing agent and/or inhalable agent can then be contained in the microstructure and efficiently released upon heating, leading to a constant vapor stream and stable flavor perception. The step of mixing an aerosol forming agent, optionally a foam forming agent—in the first method—and optionally a solvent, preferably under heating, as well as an optional aeration step thereafter or concomitantly can be carried out in a sufficient time, e.g. 1 min to 1 hour, e.g. 2 to 10 minutes, e.g. while aerating the mixture.

In the first method and the second method the tobacco ingredient containing agent and/or inhalable agent are preferably added after the foam forming agent. In this case the tobacco ingredient containing agent and/or inhalable agent can be equally distributed and enables a constant release of flavor and stable perception of flavor. This method is particularly suitable if the tobacco ingredient containing agent and/or inhalable agent is at least partly participating in formation of the foam.

The step of adding to the mixture a foam forming agent in the method of the second aspect as well as an optional aeration step thereafter can be carried out in a sufficient time, e.g. 1 min to 1 hour, e.g. 2 to 10 minutes, e.g. while aerating the mixture. Also the step of adding a tobacco ingredient containing agent and/or an inhalable agent as well as an optional aeration step thereafter can be carried out in a sufficient time, e.g. 1 min to 1 hour, e.g. 2 to 10 minutes, e.g. while aerating the mixture. Further, the adding a foam stabilizing agent and an aeration step thereafter, if it is not aerated after cooling, can be carried out in a sufficient time, e.g. 1 min to 1 hour, e.g. 2 to 10 minutes, e.g. while aerating the mixture. Also, aeration while and/or after cooling can be carried out in a sufficient time, e.g. 1 min to 1 hour, e.g. 2 to 10 minutes.

In certain embodiments the mixture can be heated to 30-80° C., e.g. to 35-75° C., preferably between and including 40-60° C., e.g. about 45° C., when mixing the components in the present methods, e.g. at least an aerosol forming agent, a foam forming agent and optionally a solvent. The heating can for example aid dispersion, e.g. by lowering viscosity. However, it is not excluded that heating is carried out after mixing the components in the present methods, i.e. that no heating is carried out during the mixing. The heating also can aid in the forming of a stable rigid structure. According to certain embodiments, heating is carried out after mixing the components in the methods described therein, e.g. directly after the mixing step. It is also not excluded that a part of the heating energy comes from the mixing, e.g. when applying a high shear stress during mixing.

If water and/or an acid and/or ester, e.g. diacetin, are added as solvent and/or additive, they preferably are added in an amount of up to 5 wt.-%, preferably up to 3.5 wt.-%, further preferably up to 2.5 wt.-%, even further preferably up to 1.5 wt.-%, based on the weight of the resulting foam. This enables better handling and particularly also makes drying easier and, according to certain embodiments, even unnecessary. If an ester, e.g. diacetin, is added, it is preferably included with 3 wt.-% or less, preferably 2 wt.-% or less, further preferably 1.5 wt.-% or less, e.g. 1 wt.-% or less, e.g. less than 1 wt.-%.

According to certain embodiments, the foam stabilizing agent is added last, i.e. after the aerosol forming agent, the foam forming agent, the tobacco ingredient containing agent and/or the inhalable agent, the optional solvent, and further optional ingredients. Optional solvent, and further optional ingredients can be added in a suitable step, e.g. together with the tobacco ingredient containing agent and/or the inhalable agent.

A final addition of the foam stabilizing agent leads to a stable formation of the foam matrix. This enables a suitable release of aerosol forming agent and flavor, thus enabling a better handling and particularly keeping volatiles in the foam matrix. During heating, at least the foam forming agent and foam stabilizing agent remain as a—disposable—shell after foam formation and evaporation of aerosol forming agent and at least aromas and/or flavors of the tobacco ingredient containing agent and/or the inhalable agent.

In certain embodiments the mixture can be cooled to room temperature and further below, for example 15-25° C., e.g. about 20° C., or below, e.g. to less than 20° C. or even less than 10° C., e.g. in a rapid fashion, e.g. in less than 20 minutes, e.g. 15 minutes or less, e.g. 10 minutes or less. According to certain embodiments, the foam can be aged for 4-24 hours, e.g. 12-24, or e.g. 6-8 hours, and/or at a temperature of 35-60° C., e.g. 40-55° ° C. The mixing and addition of components in this method are not particularly limited and can be suitably carried out by known methods. In certain embodiments the steps in the method of forming a foam can be performed in the order as indicated above for the respective method. With the present methods, particularly the foams of the present invention can be obtained as well. Thus, according to certain embodiments, the different compounds can be added suitably in such an amount that the present foams are obtained. The corresponding amounts are mentioned also with regard to the present foam.

According to certain embodiments, the foam is portioned and/or shaped after the forming of the foam. The portioning thereof is not particularly restricted and can be carried out e.g. by cutting into an appropriate shape and/or size. If an aging step is carried out, it can be e.g. carried out also after the portioning and/or shaping step, i.e. the portioning and/or shaping is carried out after cooling. With an appropriate aging step a tensile strength of the final foam between 20 and 150 N, e.g. between 30 and 90 N can be achieved, which can then be packaged automatically at a suitable speed, e.g. with a feed rate of between 0.1 and 0.5 mm/s, e.g. between 0.12 and 0.3 mm/s. e.g. at 0.16 mm/s.

With the present methods the foams of the present invention, particularly the foams of the third to sixth aspect of the invention, can be produced. Therefore, the aerosol forming agent, the foam forming agent, the foam stabilizing agent, the tobacco ingredient containing agent and/or the inhalable agent can be chosen as indicated also with regard to the foams of the invention, as well as the amounts of each of these. Also, at least one non-tobacco flavoring agent and/or an electrically conducting material and/or other optional ingredients can be suitably added, as indicated also with regard to the present foams.

In a third aspect the present method relates to a foam produced by the present methods.

According to certain embodiments, the foam has an aeration of at least 4 vol. %, preferably having an aeration of at least 5 vol. %, e.g. 5-7 vol. %, based on the total volume of the foam. The measurement of the aeration of the foam of the third aspect therein also applies to the foams of the other aspects, i.e. the third to seventh aspect.

In a fourth aspect the present invention relates to a foam comprising:

a tobacco ingredient containing agent and/or an inhalable agent, an aerosol forming agent, a foam stabilizing agent, and a foam forming agent, wherein the weight of the tobacco ingredient containing agent and/or the inhalable agent is 0.1-33 wt.-% of the weight of the foam, and the weight of the aerosol forming agent is 10-80 wt. %, preferably 40-70 wt.-%, of the weight of the foam, having an aeration of at least 4 vol. %, preferably having an aeration of at least 5 vol. %, e.g. 5-7 vol. %, based on the total volume of the foam.

In a fifth aspect the present invention relates to a foam essentially consisting of a tobacco ingredient containing agent and/or an inhalable agent, an aerosol forming agent, a foam stabilizing agent, and a foam forming agent, having an aeration of at least 4 vol. %, preferably having an aeration of at least 5 vol. %, e.g. 5-7 vol. %, based on the total volume of the foam, preferably consisting of a tobacco ingredient containing agent and/or an inhalable agent, an aerosol forming agent, a foam stabilizing agent, and a foam forming agent. According to certain embodiments, the weight of the aerosol forming agent is 10-80 wt. %, preferably 40-70 wt.-%, of the weight of the foam in the foam of the fifth aspect.

In a sixth aspect the present invention relates to a foam comprising:

a tobacco ingredient containing agent and/or an inhalable agent, an aerosol forming agent, a foam stabilizing agent, and a foam forming agent, wherein the foam forming agent is a non-protein containing polysaccharide and the weight of the foam forming agent is less than 20 wt.-% of the foam, having an aeration of at least 4 vol. %, preferably having an aeration of at least 5 vol. %, e.g. 5-7 vol. %, based on the total volume of the foam, preferably wherein the weight of the tobacco ingredient containing agent and/or the inhalable agent is 0.1-33 wt.-% of the weight of the foam, and/or the weight of the aerosol forming agent is 10-80 wt. %, preferably 40-70 wt.-%, of the weight of the foam. According to certain embodiments, the weight of the tobacco ingredient containing agent and/or the inhalable agent is 0.1-40 wt.-%, preferably 0.1-33 wt.-% of the weight of the foam, and/or the weight of the aerosol forming agent is 10-80 wt. %, preferably 40-70 wt.-%, of the weight of the foam.

Small amounts of water and/or acid and/or ester, e.g. diacetin, up to 5 wt.-%, preferably up to 3.5 wt.-%, further preferably up to 2.5 wt.-%, even further preferably up to 1.5 wt.-%, can be contained in the foam according to the second aspect of the invention.

Also disclosed is in a seventh aspect a foam comprising a foam stabilizing agent, a foam forming agent, and an aerosol forming agent, wherein the weight of the aerosol forming agent in the foam is 10-80 wt. %, preferably 40-70 wt.-%, of the weight of the foam, having an aeration of at least 4 vol. %, preferably having an aeration of at least 5 vol. %, e.g. 5-7 vol. %, based on the total volume of the foam, preferably consisting essentially of the foam stabilizing agent, the foam forming agent, and the aerosol forming agent, further preferably consisting of the foam stabilizing agent, the foam forming agent, and the aerosol forming agent.

The present foams, i.e. of the third to seventh aspect, can be—according to certain embodiments—configured to be heated but not combusted, i.e. are used in an application where it is not smoked. Thus, disclosed is also a use of the present foams as articles that are not combusted, and the use thereof in non-smoking applications, e.g. for evaporating devices like e-cigarettes, e-pipes and similar devices. The present foams can be used in a vaporizer device comprising a heater for heating the foam to a temperature of at most 350° ° C., preferably at most 300° C., further preferably below 300° C. and most preferably between 220° C. and 270° C.

In the following, the description relates to the present foams, unless clear from context that it is otherwise.

The present foams preferably are not smokable, i.e. are applied in a way that they are not heated to such temperature where they are combusted, but only at least parts thereof are evaporated, particularly at least essentially the aerosol forming agent and further preferably at least a part of the tobacco ingredient containing agent and/or the inhalable agent, further preferably also essentially the tobacco ingredient containing agent and/or the inhalable agent. In the present foams, at least some parts of the tobacco ingredient containing agent and/or the inhalable agent preferably is adhered to the foam structure and/or absorbed by the foam structure formed essentially by the foam forming agent and the foam stabilizing agent, so that it can be easily released together with the aerosol forming agent upon heating. Also, it is possible that some parts of the tobacco ingredient containing agent and/or the inhalable agent are bound to the foam structure and the tobacco ingredient containing agent and/or the inhalable agent are "extracted" during heating thereof, so that a flavor from the tobacco ingredient containing agent and/or the inhalable agent is released thereof together with the aerosol forming agent. According to certain embodiments, the tobacco ingredient containing agent and/or the inhalable agent is configured in such a way that it is released upon heating together with the aerosol forming agent by only being essentially adsorbed to and/or absorbed in the foam structure. In this regard it was shown by the inventors that a mass loss in the foam can be observed that shows that essentially at least the mass of the foam forming agent and the foam stabilizing agent remains. It is assumed that the structure of the foam is mainly formed by the foam forming agent, which forms a "capsulation" for adhering and/or absorbing the aerosol forming agent and the tobacco ingredient containing agent and/or an inhalable agent, whereas the foam stabilizing agent stabilizes the foam to keep the foam form.

According to certain embodiments, only a small amount or essentially no amount, e.g. no amount, of the aerosol forming agent takes part in foam formation, i.e. is bound within the foam. The aerosol forming agent does preferably not form the foam structure and further preferably essentially is adhered to the foam structure and/or included in the foam structure, e.g. trapped in pores thereof at ambient temperature of e.g. 0 to 40° C., e.g. room temperature of about 20 to about 25° C.

Thus, according to certain embodiments, the present foams will experience a significant weight loss due to the aerosol forming agent at least upon heating to a temperature where the aerosol forming agent is evaporated, e.g. to a temperature that is at least as high as the highest boiling point of all aerosol forming agents contained, but preferably below a temperature at which the foam is combusted. Therefore, the invention also refers to a foam that is resulting from a heating of the present foams of the third to seventh aspect, particularly to a temperature that is at least as high as the highest boiling point of all aerosol forming agents contained, but preferably below a temperature at which the foam is combusted, wherein particularly at least 40 wt.-%, preferably at least 45 wt.-%, further preferably at least 50 wt.-%, particularly preferably at least 60 wt.-% of the weight of the unheated foam is lost upon heating.

Also, the foams are—according to certain embodiments—not bound and/or connected to a carrier, i.e. can be used as is, i.e. as free-standing foam. Particularly, the foam are not bound to a substrate according to certain embodiments, but rather are used as is. Thus, according to certain embodiments, the present foams are stable enough to be used as is, i.e. are self-supporting, and have a sufficient stiffness so that they are not bent when picked up on their own and do not require a further stabilizing substrate.

According to certain embodiments, the present foams are biodegradable.

The following description relates to the foams described above, and thus applies to each of these. All present foams can be e.g. in the form of a mousse.

The foam structure in the foams is not particularly limited and can, for example, comprise trapped air bubbles and/or bubbles of other gases such as nitrogen or oxygen, e.g. air bubbles. It can be provided as an open structure with a large surface area, which enables heat and aerosol to circulate through the foam, particularly during heating, thus providing uniform heating, a good quality aerosol, and extremely efficient extraction of the tobacco ingredient containing agent and/or the inhalable agent. According to certain embodiments the foam is an open pored foam. This means that the foam has an open pore structure according to certain embodiments. With an open pored structure, i.e. an open pored foam, circulation of heat and aerosol is enhanced. It can be a liquid foam, a dry foam, a solid foam, or a pellet, preferably a dry foam, a solid foam or a pellet. The foam forming agent generally can trap the bubbles when the foam is formed, e.g. whipped, and the foam stabilizing agent can reduce and even prevent breakdown of the foam. The bubbles of the foam may have an average diameter in the range of 20-120 μm, e.g. 50-100 μm, e.g. 60-80 μm, and about 98% of the bubbles may have a diameter of 180 μm or less, e.g. 160 μm or less, e.g. 140 μm or less, e.g. 120 μm or less. According to certain embodiments at least 20%, preferably at least 30%, further preferably at least 35%, even further preferably at least 40% of the bubbles, also possibly referred to as pores, in the foam have a diameter between 25 μm and 50 μm, and/or at least 15%, preferably at least 23%, further preferably at least 27%, even further preferably at least 30% of the bubbles have a diameter between 51 μm and 100 μm, and/or at least 11%, preferably at least 15%, further preferably at least 19%, even further preferably at least 22% of the bubbles have a diameter between 101 μm and 171 μm. The diameter therein can be determined e.g. using a microscopy method, e.g. using a Digital Microscope VHX Keyence. However, the method of determining the bubble size is not particularly restricted. The foam may be formed into any suitable shape for insertion into an e-cigarette. According to certain embodiments, the present foam comprises at least one blind or hole through the foam for circulation and aerosol transmission, e.g. one, two, three, four, five, six, seven, eight, nine, ten or more hole through the foam. An example shape is an annular pipe shape hole going through the foam portion of any shape, e.g. of about 1 cm diameter, e.g. a 3 mm through hole, or a square, a star, but can also be any other shape or dimension. According to certain embodiments, the foam is having a structure having a big surface area, e.g. having at least one surface with at least one distance between any two sides of the surface or with a diameter that is sufficiently larger than the thickness of the foam. The foam can thus be in the shape of a disc, e.g. a cylindrical disc, a thin plate, etc. According to certain embodiments the at least one hole is going through the at least one surface with at least one distance between any two sides of the surface or with a diameter that is sufficiently larger than the thickness of the foam.

The tobacco ingredient containing agent, e.g. tobacco, may be used to provide authentic flavor, and is not particularly limited. According to certain embodiments, the tobacco ingredient containing agent of the present foam is at least one selected from the group consisting of tobacco, tobacco flavor such as various tobacco extracts, and nicotine or a derivative thereof. The tobacco, tobacco flavor and/or nicotine may be derived from any part of the tobacco plant (seed, stem, leave and so on).

Similarly, the inhalable agent is not particularly limited, and may be e.g. at least one of a stimulant, e.g. caffeine, guarana, and combinations thereof, and/or a flavor, e.g. menthol, natural and/or artificial plant flavors, e.g. flavourings known for use in conventional e-liquids for use with e-liquid vapourising e-cigarettes, e.g. in the amounts used therein, saccharides, animal flavors, and combinations thereof.

The tobacco ingredient containing agent and/or the inhalable agent are preferably comprised in the present foam in an amount of 0.1 to 40 wt.-%, further preferably 0.1-33 wt.-% of the weight of the foam. If the amount of tobacco is increased above 40 wt. %, particularly above 33 wt.-% of the weight of the foam, for example at the expense of the stabilizing agent, the foam, e.g. in a mousse, may become too brittle and unstable. Also if the amount of the tobacco ingredient containing agent and/or the inhalable agent is increased above this amount, the amount of the aerosol forming agent may be reduced, which can cause a lower amount of aerosol TPM (total particle matter, which is the amount of aerosol matter retained in a filter per user inhale). In certain embodiments the amount of tobacco ingredient agent and/or inhalable agent comprised in the foam is 1-30 wt.-% of the weight of the foam, preferably 3-29 wt. %, further preferably 5-28 wt.-%, more preferably 10-28 wt. %, even further preferably 11 to 27.5 wt.-%, e.g. 15 to 25 wt.-%, e.g. 11-23 wt.-%, e.g. 17-21 wt.-%.

According to certain embodiments, the tobacco ingredient containing agent comprises tobacco particles having a particle size of less than 200 μm, preferably less than 150 μm, further preferably less than 100 μm, even further preferably less than 50 μm, even preferably less than 30 μm, e.g. 2-150 μm, e.g. 5-100 μm, e.g. 5-50 μm, e.g. 5-30 μm, e.g. 5-15 μm, e.g. 20-50 μm, e.g. 60-90 μm. The particle size can be measured through sieving, and the particles may be obtained through any suitable shredding and/or milling process. According to certain embodiments, the tobacco particles have essentially a uniform size, e.g. a uniform size.

According to certain embodiments, the tobacco ingredient containing agent comprises tobacco particles having a particle size (D90) between 50 and 180 μm, preferably between 60 and 140 μm, further preferably between 65 and 125 μm, even further preferably between 70 and 110 μm, particularly preferably between 75 and 90 μm, e.g. having a particle size (D90) of about 80 μm. The particle size (D90) therein can be determined using a laser refraction method, particularly using a Malvern Mastersizer 3000. The parameter (D90), also known as Dv(90), thereby defines the point in the size distribution, up to and including which 90% of the total tobacco particles in the tobacco ingredient containing agent is contained. For example, if the D90 is 80 μm, this means that 90% of the sample has a size of 80 μm or smaller. The parameter D(90) is preferably measured after dry dispersion of the sample by laser refractometry, using the Malvern Mastersizer 3000, particularly in line with the instructions given for the measurement using the Malvern Mastersizer 3000. The D(90) results are given in volume % (Vol. %). When the particle size (D90) is too high, an aerosol formed by heating but not combusting an inventive foam shows harshness and off-taste.

However, it is also possible to add tobacco particles with different sizes in two or more fractions, e.g. a first fraction with particles having a size of less than 30 μm, e.g. less than 20 μm, and a second fraction with particles having a size of more than 30 μm, e.g. more than 50 μm, e.g. more than 100 μm, e.g. more than 200 μm. e.g. about 250 μm or more. Preferably, a, e.g. second, fraction of tobacco particles with a size of more than 30 μm is contained in a mixture of tobacco particles with different sizes in an amount of less than 90 wt.-%, preferably 80 wt.-%, or less, further preferably less than 50 wt.-%, even further preferably less than 40 wt.-%, even further preferably less than 30 wt.-%, even further preferably 20 wt.-% or less, based on the total weight of the tobacco particles. An addition of tobacco particles with a size of more than 30 μm can lead to a reduction in harshness of the aerosol liberated from the foam upon heating in the first puffs.

In the present foams, the foam stabilizing agent is not particularly limited as long as it can stabilize the foam to some extent after formation. According to certain embodiments, the foam stabilizing agent of the present foam is selected from the group consisting of cellulose gum, hydroxyalkylated carbohydrates, derivatives thereof, e.g. salts thereof, preferably alkali metal salts thereof, e.g. sodium and/or potassium salts thereof, and mixtures thereof. Both of the cellulose gum and the hydroxyalkylated carbohydrates are not particularly restricted. According to certain, preferred, embodiments, the foam stabilizing agent is a cellulose gum, particularly a carboxymethylcellulose, or a derivative thereof. An exemplary, preferred, cellulose gum which may be used in the present invention is CEKOL® 2000 and/or Ceroga 4550C (C.E. Roeper GmbH), a purified sodium carboxymethylcellulose each. Another class of suitable foam stabilizing agents are hydroxyalkylated carbohydrates, and more preferably cellulose ethers and derivatives thereof. A cellulose ether or derivative thereof that can be used can have at least one substituent selected from the group consisting of methyl, ethyl, hydroxyethyl and hydroxypropyl groups. It can further be substituted with a linear or branched substituted or unsubstituted alkyl radicals having 1-20 carbon atoms or an aralkyl radical having 7 to 20 carbon atoms. Such radical is preferably attached by an ether linkage. Suitable substituents can e.g. a hydroxy group, a carboxy group with 1 to 4 carbon atoms, etc. According to certain embodiments the cellulose ether is selected from hydroxyethylcellulose, methylcellulose, methylhydroxyethylcellulose, ethylhydroxyethylcellulose, and mixtures thereof. Furthermore, mixtures of different cellulose gums, different hydroxyalkylated carbohydrates, and mixtures of one or more cellulose gum with one or more hydroxyalkylated carbohydrate, as well as derivatives of one or either thereof, can be used. Also included as derivatives are salts of these cellulose ethers, preferably alkali metal salts thereof, e.g. sodium and/or potassium salts thereof.

According to certain embodiments the foam stabilizing agent has a viscosity between 300 mPas and 3000 mPas, preferably between 400 mPas and 2500 mPas, further preferably between 500 mPas and 2000 mPas, even further preferably between 700 mPas and 1700 mPas, particularly preferably between 900 mPas and 150 mPas. The viscosity can be suitably measured using a Brookfield viscometer, e.g. at 25° C., e.g. at 60 rpm, e.g. using paddle no. 3, e.g. at 1% (LVT).

The amount of the foam stabilizing agent in the foam is not particularly limited as long as a suitably stable foam can be formed. For example, the foam stabilizing agent can be contained in an amount of 3-60 wt.-%, preferably 4-50 wt.-%, more preferably 4-45 wt.-%, more preferably 4.2-40 wt.-%, further preferably 4.5-20 wt.-%, even further preferably 5-20 wt.-%, even further preferably 5.5-16 wt.-%, e.g. 8-40 wt.-%, e.g. 12-30 wt.-%, e.g. 16-20 wt.-%.

Also the foam forming agent is not particularly restricted. According to certain embodiments, the foam forming agent of the present foam is selected from the group consisting of agar, gellan gum, lecithin, polyglycerol esters of fatty acids, glycerol esters of fatty acids, sorbitan esters of fatty acids, and/or mixtures thereof, without being limited thereto. A preferred foam forming agent is gellan gum. It has been shown that particularly proteoglycans, but also pectin and alginates, are less suitable as foam forming agents. The fatty acids therein are not particularly limited and can comprise e.g. 8-40 carbon atoms. Glycerol esters can be prepared by standard esterification methods. If glycerol esters of fatty acids are used, the foam forming agent can suitably be a compound such as glycerol monostearate and/or glycerol monooleate. Polyglycerol esters can be prepared by polymerizing glycerin under alkaline conditions suitably followed by reacting them with specific fatty acids. Suitable polyglycerol esters can be hexaglycerol monooleate, octaglycerol monostearate and/or octaglycerol monooleate. Sorbitan esters of fatty acids used in certain embodiments of the present invention can be sorbitan monostearate, sorbitan monooleate and/or sorbitan mono palmitate. Furthermore, any possible combinations of compounds belonging to the above mentioned classes can be used.

According to certain embodiments, the foam forming agent has a gel strength between 300 g/cm$^3$ and 3000 g/cm$^3$, preferably between 400 g/cm$^3$ and 2500 g/cm$^3$, further preferably between 500 g/cm$^3$ and 2000 g/cm$^3$, and/or has a viscosity between 300 mPas and 3000 mPas, preferably between 400 mPas and 2500 mPas, further preferably between 500 mPas and 2000 mPas. The viscosity can be measured as given above for the foam stabilizing agent, for example. The gel strength can be e.g. suitably measured using the Nikan method or the Kobe method, e.g. the Nikan method.

By choosing suitable amounts of foam forming agent and foam stabilizing agent together with the tobacco ingredient containing agent and/or the inhalable agent can create and stabilize the foam matrix, which can contribute to the hardness of the foam.

Like the foam stabilizing agent, the amount of the foam forming agent is not particularly limited as long as a foam is formed. For example, the foam forming agent can be contained in an amount of 0.5-12 wt.-%, preferably 1-11 wt.-%, more preferably 1.5-10 wt.-%, further preferably 1.8-9.5 wt.-%, further preferably 2-9 wt.-%, even further preferably 2-7 wt.-%, particularly preferably 2.25-6.75 wt.-%, e.g. 3-5.5 wt.-%.

Furthermore, also the aerosol forming agent is not particularly limited, and the foam can comprise also more than one aerosol forming agent, e.g. two, three or four, e.g. in the form of a mixture.

According to certain embodiments, the aerosol forming agent of the present foam is selected from the group consisting of glycerol, glycol derivatives, sebacate esters, and/or mixtures thereof, without being limited thereto. A glycol derivative that can be used in certain embodiments is propylene glycol, and a suitable sebacate ester can be di-2-ethylhexyl sebacate. Furthermore, any possible combinations of compounds belonging to the above mentioned classes can be used. For example, a combination of glycerol and propylene glycol can be used as aerosol forming agent. Preferred examples of the present aerosol forming agent are glycerol, propylene glycol, and mixtures thereof, with glycerol and a mixture of propylene glycol and glycerol further preferred and a mixture of propylene glycol and glycerol even further preferred. According to certain embodiments, at least glycerol is comprised as an aerosol forming agent. According to certain embodiments, the glycerol and propylene glycol can be used with equal weight percent, but also with different weight percent. In certain embodiments, 10-95 wt.-% of glycerol and 5-90 wt.-% of propylene glycol, preferably 10-80 wt.-% of glycerol and 20-90 wt.-% of propylene glycol, further preferably 10-70 wt.-% of glycerol and 70-10 wt.-% of propylene glycol, e.g. 15-65 wt.-% of glycerol and 65-15 wt.-% of propylene glycol, preferably 20-40 wt.-% of glycerol and 10-40 wt.-% of propylene glycol, e.g. 20-40 wt.-% of glycerol and 20-40 wt.-% of propylene glycol can be used as aerosol forming agent, wherein the total mass of the aerosol forming agent is 10 to 80 wt.-%, preferably 40-70 wt.-% of the weight of the foam, so that the two components can be suitably set regarding their ratio. According to certain embodiments, glycerol is used as sole aerosol forming agent, though.

A suitable ratio of propylene glycol and glycerol is, according to certain embodiments, in a mixture comprising these two as aerosol forming agent or consisting of these two as aerosol forming agent, according to preferred embodiments between 8:1 and 1:8, preferably between 80:20 and 20:80, further preferably between 4:1 and 1:4, further preferably between 70:30 and 30:70, even further preferably between 1:2 and 2:1, e.g. between 60:40 and 40:60, e.g. between 55:45 and 45:55, based on a weight ratio. According to certain embodiments, glycerol is used in an excess amount compared to propylene glycol if they are both used as a mixture for an aerosol forming agent or particularly are used as aerosol forming agent. According to certain embodiments, glycerol is used in an amount of at least 55 wt.-%, preferably at least 60 wt.-%, based on the total amount of glycerol and propylene glycol in the aerosol forming agent. Accordingly, according to certain embodiments, propylene glycol is used in an amount of at most 45 wt.-%, preferably 40 wt.-% or less, based on the total amount of glycerol and propylene glycol in the aerosol forming agent. According to certain embodiments, the ratio between glycerol and propylene glycol is between 20:80 and 90:10, preferably between 40:60 and 85:15, further preferably between 55:45 and 80:20, even further preferably between 60:40 and 80:20, e.g. around 60:40, e.g. 60:40, based on the total amount of glycerol and propylene glycol in the aerosol forming agent. The ratio of propylene glycol and glycerol can influence the basic viscosity of the foam. A higher amount of glycerol leads to a higher viscosity and to a better texture of the foam, e.g. a mousse and enables a better release of the tobacco ingredient containing agent and/or the inhalable agent, leading to a better "body" for inhalation due to a better mingling. Further, a higher amount of glycerol can lead to a decreased level of initially created vapor upon heating, which can have an influence on the harshness of the vapor felt upon inhalation. At the same heating temperature, also glycerol can release less vapor volume than propylene glycol if the heating is above the boiling point of both. A higher amount of propylene glycol leads to a sweet top note during inhalation especially if 10 wt.-% or more, preferably 20 wt.-% or more, e.g. 20 to 40 wt.-%, or more than 20 wt.-%, more than 30 wt.-%, or more than 40 wt.-% of the total humectant/aerosol forming agent comprises propylene glycol rather than glycerin.

According to certain embodiments the aerosol forming agent is comprised in an amount of 10 to 80 wt.-%, preferably 20 to 75 wt.-%, further preferably 40-70 wt.-%, further preferably 45-70 wt.-%, more preferably 45-65 wt.-%, particularly preferably 50-63 wt.-%, more preferably 55 to 65 wt.-%, e.g. about 60 wt.-% of the weight of the foam, which is much higher than in the prior art regarding reconstituted tobacco foams, as an aerosol is to be formed. This can for example enable a more convenient foam manufacturing process than in the prior art. If the amount of aerosol forming agent is too high, though, no foam is formed, but a creamy liquid fluid. If the amount of aerosol forming agent is too low, no foam is formed, but a paste particularly without a foam structure, particularly bubbles and/or pores.

Propylene glycol as used in the present invention is to be understood as propane-1,2-diol. Glycerin or glycerol as used in the present invention is to be understood as 1,2,3-propanetriol.

The aerosol forming agent can further comprise water. According to certain embodiments, no water is contained, though, since water in aerosol form can burn the mouth of a user. Water can be contained in an amount of 0-15 wt.-% of the weight of the foam, e.g. 5-10 wt.-%. Small amounts of water and/or an acid and/or ester, e.g. diacetin, particularly of water and/or ester, e.g. diacetin, up to 5 wt.-%, preferably up to 3.5 wt.-%, further preferably up to 2.5 wt.-%, even further preferably up to 1.5 wt.-%, and most preferably between 0.5-1.5 wt.-%, at least between 0.5-1.5 wt.-% water, can be contained in the foam. According to certain embodiments, no water and/or acid, particularly no water and/or ester, e.g. diacetin, is contained in the present foam. If an ester, e.g. diacetin, is included, it is preferably included with 3 wt.-% or less, preferably 2 wt.-% or less, further preferably 1.5 wt.-% or less, e.g. 1 wt.-% or less.

According to certain embodiments, the present foams can further comprise at least one non-tobacco flavoring agent. In certain embodiments, the flavors can be selected from menthol, natural plant flavors, e.g., cinnamon, sage, herb, chamomile, kudzu (*Pueraria lobata*), hydrangeae dulcis folium, clove, lavender, cardamom, caryophyllus, nutmeg, bergamot, geranium, honey essence, rose oil, lemon, orange, cassia bark, caraway, jasmine, ginger, coriander, vanilla extract, spearmint, peppermint, cassia, coffee, celery, cascarilla, sandalwood, cocoa, ylang ylang, fennel, anise, licorice, St John's bread, prune extract, and peach extract; saccharides, e.g., glucose, fructose, isomerized saccharide, and caramel; cocoa, e.g., powder and extract; esters, e.g., isoamyl acetate, linalyl acetate, isoamyl propionate, and linalyl butyrate; ketones, e.g., menthone, ionone, damascenone, and ethyl maltol; alcohols, e.g., geraniol, linalool, anethole, and eugenol; aldehydes, e.g., vanillin, benzaldehyde, and anisaldehyde; lactones, e.g., γ-undecalactone and γ-nonalactone; animal flavors, e.g., musk, ambergris, civet, and castoreum; and hydrocarbons, e.g., limonene and pinene, and combinations thereof, without being limited thereto. Such a flavor or others can be used alone or in combination. The non-tobacco flavoring agent can be e.g. added in an amount so that the total amount of tobacco ingredient containing agent and the non-tobacco flavoring agent, in case these two are comprised, add up to the amounts given for the tobacco ingredient containing agent given above.

In certain embodiments, the foams may comprise an electrically conducting material, and more particularly a ferromagnetic material, to generate heat by induction. The electrically conducting material is not particularly limited and may be any one of, or alloys of, iron, nickel, stainless steel, manganese, silicon, carbon and copper. The electrically conducting material might be in the form of a powder and/or larger particles. The amount thereof is not particularly restricted and can be suitably set.

According to certain embodiments the present foams comprise a solvent and/or an acid and/or an ester in an amount of up to 15 wt.-%, based on the total weight of the foam, preferably up to 5 wt.-%, e.g. as given above with regard to the present method. According to certain embodiments, a solvent, preferably water, and/or an acid and/or an ester are comprised in an amount of up to 15 wt.-% prior to any drying stage, based on the total weight of the foam, preferably up to 5 wt.-%.

According to certain embodiments, the present foams comprise a pH adjusting agent. The pH adjusting agent is not particularly restricted and can be e.g. chosen from one or more of sodium carbonate, potassium carbonate, sodium hydrogen carbonate, potassium hydrogen carbonate, etc., and mixtures thereof. The amount thereof is not particularly restricted and can be e.g. between 0 and 2 wt.-%, preferably between 0.2 and 1.5 wt.-%, further preferably between and including 0.5 and 1 wt.-%, based on the total amount of the foam. According to certain embodiments, the present foams comprise a pH adjusting agent so that the pH of the foam is adjusted to a pH value between 5 and 9, e.g. between 5 and 8.5, preferably between 5.7 and 8.4, further preferably between 6 and 8.3. The addition of a pH adjusting agent can increase the amount of the tobacco ingredient containing agent and/or the inhalable agent, e.g. nicotine, released, or perceived by a user as having been released, which can improve sensory satisfaction. However, if the pH is adjusted too high, this might negatively affect the taste.

The present foams can for example be formed into a foam pipe, disc, etc., with optionally one or more tunnels and/or holes for the airflow, and a foam stick, etc. can for example be cut into pod-sized pieces to be placed in a pod.

In another embodiment, the foams can be arranged as a pod, disc, or stick, and may be wrapped in a porous paper, for example with a filter at the tip proximal the user. The porous paper is not particularly limited and may be made of wood pulp and/or hemp fibers or combinations thereof. The filtering material of the filter is not particularly limited and may be any filamentary material conventionally employed for tobacco smoke filter manufacture. The filtering material may be a natural or synthetic filamentary tow, e.g. of cotton or plastics such as polyethylene or polypropylene, or cellulose acetate filamentary tow.

The present foams may be sold in packaging, e.g. a hermitically sealed wrapper, which may for example be removed by the user or perforated by the e-cigarette when operatively housed. Another example can be a blister pack containing one or several foam units, either together or separate, e.g. separated, i.e. in separated packaging units that can be opened separately. According to certain embodiments, the packaging at least prevents water from contacting the present foams.

A peripheral supporting material e.g. metal or other inert material for heat transmission may surround the present foam. In an example of an annular ring foam, the supporting material can be a metal ring arranged e.g. around the side of the annulus. The supporting material may have apertures for circulation.

The present foams can form an aerosol upon being subjected to a temperature of 150-350° C., e.g. 200-300° C., preferably at least above a boiling point of an aerosol forming agent, e.g. to at least the boiling point of the aerosol forming agent with the highest boiling point, but to a temperature below which the foam is combusted. The heat can be supplied by any heat source appropriate, such as an electrical heater or another heat-generating device appropriate, which is not particularly limited. If the temperature is too low, evaporation of the aerosol forming agent in the foam is insufficient, leading to not enough aerosol. If the temperature is too high, there is a risk that the formed aerosol is too hot and that the foam may suffer from combustion.

According to certain embodiments, the foams include a porous structure which is open-pored, particularly wherein the structure is essentially formed from the foam forming agent and the foam stabilizing agent.

According to certain embodiments, the aerosol forming agent and/or the tobacco ingredient containing agent and/or an inhalable agent and/or the optional at least one non-tobacco flavoring agent is at least to some extent adhered to the foam structure and/or absorbed in the foam structure, and particularly the aerosol forming agent and/or the tobacco ingredient containing agent and/or an inhalable agent and/or the optional at least one non-tobacco flavoring agent is essentially adhered to the foam structure and/or absorbed in the foam structure. This way these components can be easily released upon heating, particularly together with the aerosol forming agent.

According to certain embodiments, the present foams further comprise a solvent and/or an acid and/or an ester in an amount of up to 15 wt.-%, based on the total weight of the foam, preferably up to 5 wt.-%, as already discussed above.

According to certain embodiments, the solvent and/or acid and/or ester are comprised in an amount of up to 15 wt.-% prior to any drying stage, based on the total weight of the foam, preferably up to 5 wt.-%. Water can be contained in an amount of 0-15 wt.-% of the weight of the foam prior to any drying stage, e.g. 5-10 wt.-%. Small amounts of water and/or an acid and/or ester, e.g. diacetin, particularly of water and/or ester, e.g. diacetin, up to 5 wt.-%, preferably up to 3.5 wt.-%, further preferably up to 2.5 wt.-%, even further preferably up to 1.5 wt.-%, and most preferably between 0.5-1.5 wt.-%, at least between 0.5-1.5 wt.-% water, can be contained in the foam prior to any drying stage. According to certain embodiments, no water and/or acid, particularly no water and/or ester, e.g. diacetin, is contained in the present foam prior to any drying stage. If an ester, e.g. diacetin, is included, it is preferably included with 3 wt.-% or less, preferably 2 wt.-% or less, further preferably 1.5 wt.-% or less, e.g. 1 wt.-% or less prior to any drying stage.

The present invention further relates to a method of generating an aerosol, the method comprising heating a foam of one of the third to seventh aspect of the invention, in the absence of combustion at 150-350° C., e.g. 200-300° C. A method of generating an aerosol can be, for example, carried out with the foam of the present invention.

In certain embodiments, the present foam may comprise tobacco, optionally nicotine and optionally at least one additional flavor. In certain other embodiments it may comprise nicotine and optionally at least one additional flavor. And in yet another embodiment it may comprise only tobacco flavoring as tobacco ingredient containing agent. And in yet another embodiment it may comprise only at least one inhalable agent and optionally at least one additional flavor.

The present invention further relates to an aerosol obtainable by heating the present foams in the absence of combustion. An absence of combustion herein means heating to a temperature which is below the combustion temperature of the components of the foam, which generate the aerosol, or even below the combustion temperature of all components of the foam. Such a temperature can be e.g. 350° C. or less, for example 150-350° C., e.g. 200-300° C.

The aerosol can be released by heating the foam. The aerosol forming agent can be mingled with the tobacco ingredient containing agent and/or the inhalable agent and optionally one or more additional flavor, and/or extract the tobacco ingredient containing agent and/or the inhalable agent. When the aerosol forming agent is heated and vaporized, the vapor can be carrying the attached tobacco ingredient containing agent and/or the inhalable agent and/or one or more compounds extracted from the tobacco ingredient containing agent and/or the inhalable agent and optionally one or more additional flavors.

Disclosed is also in an eighth aspect a method of forming a foam, comprising mixing an aerosol forming agent, a foam forming agent and optionally a solvent and/or at least one non-tobacco flavoring agent, preferably under heating;

optionally aerating the mixture;

adding a foam stabilizing agent; and cooling of the mixture;

wherein the mixture is aerated after the adding of the foam stabilizing agent and/or after cooling of the mixture, preferably wherein the foam stabilizing agent is added after the foam forming agent, aerosol forming agent, the optional solvent, and the tobacco ingredient containing agent and/or an inhalable agent.

According to certain embodiments, heating is carried out during or after adding the foam stabilizing agent; and before cooling.

Further disclosed is in a ninth aspect a method of forming a foam, comprising mixing an aerosol forming agent and optionally a solvent and/or at least one non-tobacco flavoring agent, preferably under heating;

optionally aerating the mixture;

adding a foam forming agent;

optionally aerating the mixture;

adding a foam stabilizing agent; and cooling of the mixture;

wherein the mixture is aerated after the adding of the foam stabilizing agent and/or after cooling of the mixture, preferably wherein the foam stabilizing agent is added after the foam forming agent, aerosol forming agent, the optional solvent, and the tobacco ingredient containing agent and/or an inhalable agent.

If no solvent and at least one non-tobacco flavoring agent is added, this can read as follows:

Further disclosed is in a ninth aspect a method of forming a foam, comprising providing an aerosol forming agent, preferably under heating;

optionally aerating the aerosol forming agent;

adding a foam forming agent;

optionally aerating the mixture;

adding a foam stabilizing agent; and cooling of the mixture;

wherein the mixture is aerated after the adding of the foam stabilizing agent and/or after cooling of the mixture, preferably wherein the foam stabilizing agent is added after the foam forming agent, aerosol forming agent, the optional solvent, and the tobacco ingredient containing agent and/or an inhalable agent.

These methods can e.g. form the foam of the seventh aspect. The steps in these methods can be in the order given. The components can be as given with regard to the first and second aspect.

According to certain embodiments, heating is carried out during or after adding the foam forming agent; and/or during or after adding the foam stabilizing agent; and before cooling.

According to certain embodiments of the eighth or ninth aspect, the pH of the mixture is adjusted to a pH value between 5 and 9, e.g. between 5 and 8.5, preferably between 5.7 and 8.4, further preferably between 6 and 8.3, e.g. as given with regard to the first or second aspect.

According to certain embodiments of the eighth or ninth aspect, the foam is portioned and/or shaped after the forming of the foam. All the steps in the methods of the eighth and ninth aspect can be carried out as given with regard to the first and second aspect.

The above embodiments can be combined arbitrarily, if appropriate. Further possible embodiments and implementations of the invention comprise also combinations of features not explicitly mentioned in the foregoing or in the following with regard to the examples of the invention. Particularly, a person skilled in the art will also add individual aspects as improvements or additions to the respective basic form of the invention.

EXAMPLES

The present invention will now be described in detail with reference to examples thereof.

However, these examples are illustrative and do not limit the scope of the invention.

TABLE 1

Components used in the present sample 1.

| Tobacco Mousse (TM) Compounds | Sample 1 |
|---|---|
| Propylene glycol (PG) | 24.0 wt.-% |
| Glycerin (G) | 36.0 wt.-% |
| Purified Water | 3.5 wt.-% |
| Tobacco Powder | 21.5 wt.-% |
| Gum | 4.5 wt.-% |
| Binder | 10.5 wt.-% |
| Total | 100.00 wt.-% |

Example 1

Table 1 shows components used for producing an exemplary embodiment of the present foam.

For producing exemplary foams, the ingredients given in the respective column of Table 1 were mixed and combined as follows.

First, the propylene glycol, the glycerin and the purified water were whipped and aerated for 2-10 min at 45° C. using a Krups Prep & Cook HP5031 mousse whipping shuffle. When whipping up the mousse, the speed has to be adjusted so that the volume visibly increases and small bubbles appear and partly stay in the foam. If whipping is too fast then mixing will take over and the foamy structure is going to collapse, thus back to fluid. As one option, whipping is started slowly and the whipping speed is slowly increased as the foam begins to develop a lighter, more mousse-like texture; the speed is backed-off by about 10% if it is noticed that the mousse seems to be reducing its mousse-like texture and becoming seemingly less aerated. In order to preserve the foamy structure for creating the stable portion, a sudden cooling with ice or cool water is recommendable. Using the above mentioned Krups device, the best results can be obtained with a speed in between 60 and 200 rpm. Adaptation is within the skilled artisan's knowledge in accordance with the above description.

Next, the gum was added and the mixture was whipped and aerated for 2-10 min. Afterwards the tobacco powder was added and whipping and aeration were carried out for 2-10 min. The binder was added and the mixture was again whipped and aerated for 2-10 min, the mixture was cooled to 10° C. within 10 minutes and aged at 45° C. for 8 hours. An aeration of 5-7% was achieved.

A maximum binding force can be created by suitably increasing the reaction time toward thermodynamic equilibrium. The time to achieve equilibrium is determined by kinetic effects which seem to be dependent on the product temperature mainly in the aging and binding process step. The temperature settings also can relate to the level of volatility of flavors to keep suitable tobacco mousse heating properties. Such as vapor release and flavor release, creating a distinguished taste and smell.

On the chemical level the binding force between the foam components (here in form of a mousse) is created by hydrogen bonds which lead to the required stability of the portions through a hydration of gum gel strength, e.g. between 500 g/cm$^3$ and 2000 g/cm$^3$. Preferably a viscosity of the foam forming agent, the gum, between 300 mPas and 3000 mPas, preferably between 400 mPas and 2500 mPas, further preferably between 500 mPas and 2000 mPas, even further preferably between 700 mPas and 1700 mPas, particularly preferably between 900 mPas and 150 mPas is achieved with the water, PG and G. The viscosity can be suitably measured using a Brookfield viscometer, e.g. at 25° C., e.g. at 60 rpm, e.g. using paddle no. 3, e.g. at 1% (LVT).

Example 2

The process was carried out as in Example 1, except that mixing and aeration were carried out with an aerator, Mondomix at 3000 rpm. Again, an aeration of 5-7% was achieved. Also aeration with increased pressure of 2.5 bar as counter pressure (30 mm VA) did not increase this level.

Example 3

Sample 1 from example 1 was cut and/or filled into trays with defined portion forms, shapes and sizes. The cutting force was minimal, the mixture having a tensile strength between 30 N and 90 N, so that filling could be carried out at 0.16 mm/s. The force and abrasion for taking the portions out of the tray were minimum, and also the force and abrasion for transporting the portions on a transport band for packaging were minimum.

Examples 4 and 5

Samples 2 and 3 were produced in the same way as in Example 1, except that 0.5 and 1 wt. % potassium carbonate were added in the foam, respectively, e.g. together with tobacco, reducing the amount of tobacco accordingly.

While sample 1 achieved a good puff impact and smooth, nice tobacco sweetness when heating at 245° C. with 20s until the first dry puff using an aerosol generation apparatus, sample 2 achieved a bit higher sweetness, and had a higher impact. An even further increased sensory satisfaction could be achieved with sample 3.

Example 6

Sample 1 was aged for 3 h, 5.5 h and 9 h, respectively, and cut into portions with a size of 7.5 mm. The portions were then filled at a filling speed of 0.16 mm/s into trays. FIG. 1 shows the tensile strength of the respective portions, showing that a satisfactory filling can be carried out at short travel distances. In FIG. 1, the upper line represent the sample at 9 h aging, the middle line at 5.5 h aging and the lower line at 3 h aging.

Examples 7 and 8

Samples 4 and 5 were produced like sample 1 in Example 1, except with the amounts given below in Table 2:

TABLE 2

Components used in the present samples 4 and 5.

| Tobacco Mousse (TM) Compounds | Sample 4 | Sample 5 |
|---|---|---|
| Propylene glycol (PG) | 16.0 wt.-% | 28.0 wt.-% |
| Glycerin (G) | 24.0 wt.-% | 42.0 wt.-% |
| Purified Water | 3.75 wt.-% | 1.88 wt.-% |
| Tobacco Powder | 33.0 wt.-% | 16.5 wt.-% |
| Gellan Gum food grade | 6.75 wt.-% | 3.37 wt.-% |
| Ceroga 4550C (C. E. Roeper GmbH) | 16.5 wt.-% | 8.25 wt.-% |
| Total | 100.00 wt.-% | 100.00 wt.-% |

While sample 4 achieved a richer taste and more impact, sample 5 achieved more puffs over a longer time period.

Example 9

Using sample 2, bubble diameters in the foam were determined using a Digital Microscope VHX Keyence. The initial height of the sample was 9 mm and the diameter 8 mm. Suitable slices for microscopical analysis were cut from the sample and the bubble diameters therein recorded.

Across two different portions, overall 144 pores were observed and measured.

The average pore size/bubble diameter was 72 μm, the minimum pore size was 25 μm, and the maximum pore size was 171 μm. The majority of all bubble (44%) has a diameter between 25 μm and 50 μm, about one third of all bubbles (32%) between 51 μm and 100 μm, and about one fourth of all bubbles (24%) between 101 μm and 171 μm.

Figure 2:
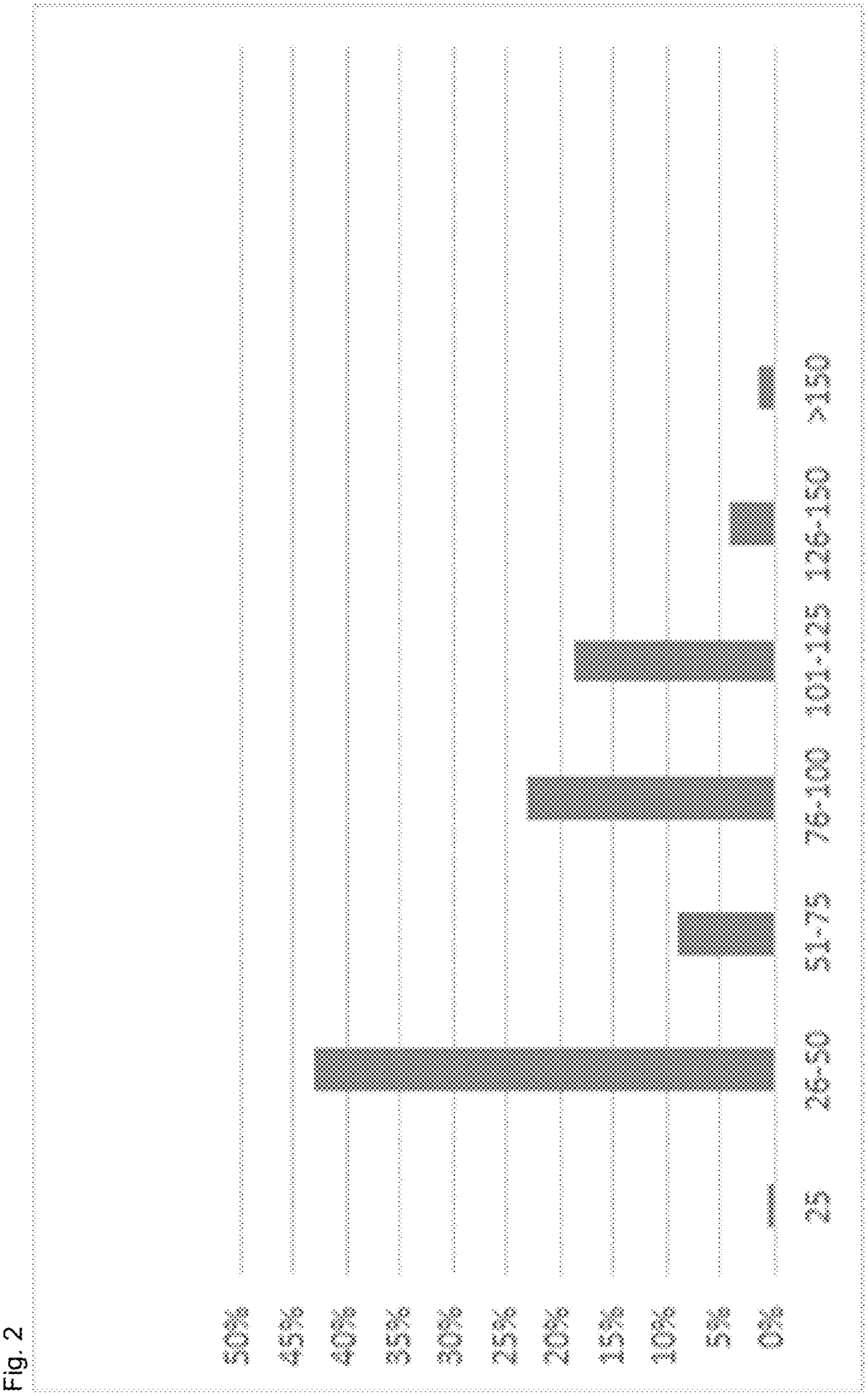
FIG. 2 represents exemplary data of the bubble diameter distribution in an example of the present invention.

Results of the measurement are also shown in FIG. 2, wherein the x-axis represents the bubble diameter in μm and the y-axis the number of bubbles recorded for a certain size in %.

Similar results were obtained for sample 3.

The invention claimed is:

1. A method of forming a foam, comprising:

mixing an aerosol forming agent and a foam forming agent, wherein the aerosol forming agent is selected from a group consisting of glycerol, propylene glycol, sebacate estes, and mixtures thereof, and wherein the foam forming agent is selected from a group consisting of agar, gellan gum, lecithin, polyglycol esters of fatty acids, glycerol esters of fatty acids, sorbitan esters of fatty acids, and mixtures thereof;

heating the mixture to a temperature between 30° C.-80° C.;

adding to the mixture a tobacco ingredient containing agent and/or an inhalable agent, wherein the inhalable agent is at least one of a stimulant and a flavor;

adding a foam stabilizing agent, wherein the foam stabilizing agent is selected from a group consisting of cellulose gum, hydroxyalkylated carbohydrates, salts thereof, and mixtures thereof; and cooling of the mixture to a temperature between 10° C.-25° C. in less than 20 minutes;

wherein the mixture is aerated after the adding of the foam stabilizing agent and/or after cooling of the mixture, wherein the aeration is carried out at a temperature between 30° C.-80° C., wherein a weight of the tobacco ingredient containing agent and/or the inhalable agent is 0.1-33 wt-% of a weight of the foam, and wherein a weight of the aerosol forming agent is 40-70 wt-% of the weight of the foam.

2. The method according to claim 1, wherein the pH of the mixture is adjusted to a pH value between 5 and 9.

3. The method according to claim 1, wherein the foam stabilizing agent has a viscosity between 300 mPas and 3000 mPas.

4. The method according to claim 1, wherein the foam forming agent has a gel strength between 300 g/cm$^3$ and 3000 g/cm$^3$, and/or wherein the foam forming agent has a viscosity between 300 mPas and 3000 mPas.

5. The method according to claim 1, wherein the foam is portioned and/or shaped after the forming of the foam.

6. The method according to claim 1, wherein the formed foam has an aeration of at least 4 vol. % based on the total volume of the foam.

7. A method of forming a foam, comprising, in following order:

mixing an aerosol forming agent, wherein the aerosol forming agent is selected from a group consisting of glycerol, propylene glycol, sebacate estes, and mixtures thereof;

adding to the mixture a tobacco ingredient containing agent and/or an inhalable agent, wherein the inhalable agent is at least one of a stimulant and a flavor;

adding a foam forming agent, wherein the foam forming agent is selected from a group consisting of agar, gellan gum, lecithin, polyglycol esters of fatty acids, glycerol esters of fatty acids, sorbitan esters of fatty acids, and mixtures thereof;

adding a foam stabilizing agent, wherein the foam stabilizing agent is selected from a group consisting of cellulose gum, hydroxyalkylated carbohydrates, salts thereof, and mixtures thereof; and cooling of the mixture;

aging the foam for a period between 4 hours and 24 hours at a temperature between 35° C. to 60° C.;

wherein the mixture is aerated after the adding of the foam stabilizing agent and/or after cooling of the mixture for a period between 1 minute and 1 hour, wherein a weight of the tobacco ingredient containing agent and/or the inhalable agent is 0.1-33 wt-% of a weight of the foam, and wherein a weight of the aerosol forming agent is 40-70 wt-% of the weight of the foam.

* * * * *